United States Patent
Nash et al.

(10) Patent No.: US 10,248,438 B2
(45) Date of Patent: Apr. 2, 2019

(54) SYSTEM AND METHODS FOR A RUN TIME CONFIGURABLE USER INTERFACE CONTROLLER

(75) Inventors: Brett S. Nash, Sydney (AU); Robert J. Karp, Sydney (AU)

(73) Assignee: FLUFFY SPIDER TECHNOLOGIES PTY. LTD., Sydney (AU)

( * ) Notice: Subject to any disclaimer, the term of this patent is extended or adjusted under 35 U.S.C. 154(b) by 1685 days.

(21) Appl. No.: 12/561,930

(22) Filed: Sep. 17, 2009

(65) Prior Publication Data
US 2011/0066962 A1    Mar. 17, 2011

(51) Int. Cl.
G06F 9/451    (2018.01)
H04M 1/725    (2006.01)

(52) U.S. Cl.
CPC ......... *G06F 9/451* (2018.02); *H04M 1/72544* (2013.01); *H04M 1/72563* (2013.01)

(58) Field of Classification Search
CPC . H02J 9/005; G05B 23/02; G06F 1/26; G06F 1/263; G06F 1/3203; G06F 9/4418; G06Q 30/0631; G06Q 30/0643
See application file for complete search history.

(56) References Cited

U.S. PATENT DOCUMENTS

| | | | |
|---|---|---|---|
| 5,867,153 A * | 2/1999 | Grandcolas et al. | 705/39 |
| 6,209,009 B1 * | 3/2001 | Schwartz et al. | 715/201 |
| 6,880,014 B2 * | 4/2005 | Brown et al. | 709/227 |
| 7,565,605 B2 * | 7/2009 | Schohn et al. | 715/249 |
| 2001/0040591 A1 * | 11/2001 | Abbott et al. | 345/700 |
| 2003/0037076 A1 * | 2/2003 | Bravery et al. | 707/517 |

(Continued)

OTHER PUBLICATIONS

"Systematic Output Modification in a 2D User Interface Toolkit", by W. Keith Edwards et al, UIST 97 B&J Alberta, Canada, Copyright 1997 ACM.*

(Continued)

*Primary Examiner* — Jeffrey A Gaffin
*Assistant Examiner* — Paul A Thatcher
(74) *Attorney, Agent, or Firm* — Kang S. Lim

(57) ABSTRACT

The present invention relates to interface control systems and methods, for use with consumer electronic devices. User Interfaces, which are normally predefined at the time of manufacture, are entirely specific to the appliance by virtue of the underlying kernel or operating system. The present system includes means for providing information to and receiving information from a user to establish control over the user interface. The means for providing and receiving the information may be controlled, at least in part, by an alterable database that is separate from both the operating system and applications. This allows the database to be changed without making any changes to the underlying operating system or applications. The alterable database may be in a script form, and may be configured by the user at any time during normal operation of the apparatus. The system may invoke or modify the information contained in the alterable database in response to stimuli external to the alterable database. The alterable database may also cause flags to be set. These flags may result in a limit to the operation of the apparatus, a limit to the operation of the applications, or an alteration of information referenced by the alterable database.

23 Claims, 28 Drawing Sheets

(56) References Cited

U.S. PATENT DOCUMENTS

| | | | | |
|---|---|---|---|---|
| 2003/0063120 | A1* | 4/2003 | Wong et al. | 345/746 |
| 2004/0061713 | A1* | 4/2004 | Jennings | 345/700 |
| 2004/0155903 | A1* | 8/2004 | Schneeberg | 345/765 |
| 2006/0200817 | A1* | 9/2006 | Callender | 717/170 |
| 2007/0094045 | A1 | 4/2007 | Cobbs et al. | |
| 2007/0143324 | A1 | 6/2007 | Eichhorst | |
| 2007/0185987 | A1 | 8/2007 | Dieberger et al. | |
| 2008/0280588 | A1 | 11/2008 | Roundtree et al. | |
| 2009/0150820 | A1 | 6/2009 | Hayman | |
| 2009/0163182 | A1* | 6/2009 | Gatti | G06F 9/4443 455/414.1 |

OTHER PUBLICATIONS

"Vista Battery Saver" downloaded from https://web.archive.org/web/20090317075055/http://vistabattery.codeplex.com/ on Jun. 2, 2014 archived Mar. 17, 2009.*

"Live Update for Device Drivers" Michael Swift et al, Department of Computer Science and Engineering, 2008.*

"WindowBlinds—extend Windows to be a fully skinnable OS via visual styles", downloaded from https://web.archive.org/web/20080725054730/http://www.stardock.com/products/windowblinds/wb3/wb3_guide_final.htm on Nov. 18, 2014 archived Jul. 25, 2008 by the Internet Wayback Machine.*

"DesktopX" by Stardock, downloaded Nov. 25, 2014 from https://web.archive.org/web/20080516230313/http://stardock.com/products/desktopx/mediaguide.pdf archived May 16, 2008 by the Internet Wayback Machine.*

"Widnows Blinds" by Stardock, downloaded Nov. 20, 2014 from https://web.archive.org/web/20081221075548/http://www.stardock.com/products/windowblinds/mediaguide.pdf archived Dec. 21, 2008 by the Internet Wayback Machine.*

Object Desktop by Stardock, , downloaded Nov. 25, 2014 from https://web.archive.org/web/20080514210548/http://www.stardock.com/products/odnt/mediaguide.doc archived May 14, 2008 by the Internet Wayback Machine.*

"Power-Saving Color Transformation of Mobile Graphical User Interfaces on OLED-based Displays" by Mian Dong et al, ISLPED'09, Aug. 19-21, 2009.*

"Stardock Windowblinds 3: Customize the look and feel of Windows: Skinning Guide" by StarDock archived Aug. 13, 2007 by the Internet Wayback Machine downloaded Nov. 20, 2014 from https://web.archive.org/web/20070813150628/http://www.stardock.com/products/windowblinds/skinning/WB%20Skinning%20Guide.pdf.*

"Motomanual: Ravr v3i GSM" by Motorola, copyright 2006.*

"What are bit flags?" by cplusplus.com, Apr. 2008, downloaded Jun. 23, 2017 from http://www.cplusplus.com/forum/general/1590.*

"DeskScapes: Media Guide" downloaded from https://web.archive.org/web/20081221075420/http://www.stardock.com:80/products/deskscapes/mediaguide.doc archived Dec. 21, 2008 downloaded Oct. 29, 2018 (Year: 2008).*

ISA/KR, PCT International Search Report and Written Opinion, Application No. PCT/IB2010/002417, dated Jun. 24, 2011, 9 pages.

Knuth, "The Art of Computer Programming" vol. 3, ISBN 0-201-03803-X Searching and Sorting, sec. 6.4 "Hashing", pp. 506-515.

* cited by examiner

SYSTEM AND METHODS FOR A RUN TIME CONFIGURABLE USER INTERFACE CONTROLLER

BACKGROUND OF THE INVENTION

The present invention relates to interface control systems and methods for use with consumer electronic devices. More particularly, the present invention relates to systems and methods for controlling a user interface on an appliance to enable enhanced user personalization and run time configurability.

Users of consumer electronic devices are increasingly interested in customization and personalization. This phenomenon has led to the wild popularity of highly personalized social networking websites pages, customizable ringtones for cellular phones, and background themes available for personal computers. Businesses and manufacturers have learned to capitalize on this user driven desire for more options by offering greater selections of product designs and colors.

This invention relates to consumer electronic devices, which include a wide range of devices, including personal computers, gaming systems and portable personal appliances such as media players, PDAs and mobile phones. Many of these consumer electronic devices have fairly similar user interfaces (UI). When looking at portable personal appliances in particular, generally speaking, the UI for such devices is part of the main application software, or code, or results from the application-specific toolkit used to design that interface.

Moreover, it is common for devices from the same manufacturer, or using the same technology base, to share many of the same core design features and so any customization or personalization is often limited. To accommodate the number of variants would require an enlargement of the operating system and consume memory in a way that dissipates the advantage of a shared core. Typically, changes which may be made by a user are relatively simple, focusing on changing backgrounds (wallpaper) or color palettes in use. In many cases alteration of the UI is possible only after changes to the core software with attendant economic penalties.

Normally an appliance may incorporate a user interface that determines how a user will experience the interaction. For example in an address book, a screen may display a symbol that invites a user to enter information and this visual element will depend entirely upon how the UI was conceived by the application programmer. Because users are strongly affected by perceived ease of use, and this is a subjective measure, manufacturers of physical product often perform lengthy studies to aid them in offering the "best" UI experience. Since the UI is often incorporated in the application program, the result is usually a longer development cycle and an unforgiving market reaction if the UI proves unpopular.

A common design pattern in computing science is the Model-View-Controller methodology originally described in reference to the Xerox PARC "Smalltalk" work circa 1979. Successful use of this scheme isolates business logic from user interface considerations, resulting in an application where it is easier to modify either the output appearance or user perception of the application or the underlying application business rules, each without affecting the other. However, a common limitation in handling the UI component of an appliance is that the UI must be specified at compile-time and thereafter only the limited and comparatively trivial changes discussed above are possible.

Commercial customization efforts to "re-skin" the display elements of a mobile phones have been attempted (TriGenix, acquired in October of 2004 and now absorbed into Qualcomm's Brew technology, used extended markup language in its 'skinning' application) but with mixed success mainly because of the complexity of use. This necessarily forced manufacturers to resort to a graphical approach to the problem with relatively onerous memory requirements.

Given the strong desire by users to personalize their appliance, as well as the risk of unpopular user interfaces which may dramatically damage appliance sales, there is a strong need to provide readily customizable interfaces which are relatively un-complex to use and do not pose onerous memory or processing requirements. Such systems and methods may provide enhanced control over personalization and modification of user interfaces in a wide range of consumer electronic devices at run time. Thus, a user may be able to see the results of changes immediately without the delays and difficulties that attend compilation and embedding processes.

In view of the foregoing, systems and methods for improving efficiency of personalization of an appliance are disclosed. The present invention provides a novel approach to the implementation of User Interfaces with unparalleled flexibility in the design phase, remarkable ease of use and minimal dependence upon an underlying application.

SUMMARY OF THE INVENTION

The present invention discloses interface control systems and methods for use with consumer electronic devices. More particularly, the present invention relates to systems and methods for controlling a user interface on an appliance to enable enhanced user personalization and run time configurability.

The interface control system may provide flexibility for a manufacturer, service provider, if any, and of course the end user. By using an interpreter, or some functional equivalent, embedded in a virtual machine, run time operations may be accomplished and a user may be empowered to see the results of changes immediately without the delays and difficulties that attend compilation and embedding processes. A manufacturer may enjoy extensive re-use of an existing OS (operating system) or Kernel and any associated applications and treat the UI design and implementation as a truly separate activity within the context of the appliance.

The system may include an apparatus capable of personalization. The apparatus may have a microprocessor, memory and an operating system. Applications which operate in conjunction with the operating system may exist on the system. These applications may generate and receive interface data.

The apparatus may likewise include a means for providing information to and receiving information from the user over a user interface. The means for providing and receiving the information may be controlled, at least in part, by an alterable database that is separate from both the operating system and applications. This may allow the database to be changed without making any changes to the underlying operating system or applications.

The alterable database may be in a script form and may be configured by the user at any time during normal operation of the apparatus. Further, the alterable database may be read by an interpreter or may be compiled to bytecode. The alterable database may also incorporate both current and prior versions of an information script, and if an error occurs in the current version, the apparatus may revert to the prior version.

In some embodiments, the alterable database references alterable information that describes at least one of format, layout and content of the information. Likewise, the database may reference at least one of scaling, skewing, transformation, animation and alteration of information.

The alterable database may, in some embodiments, be comprised of more than one personality database. These personality databases or themes are independently alterable and selectable, and each comprises a separate complete personality.

The system may invoke or modify the information contained in the alterable database in response to stimuli external to the alterable database. Likewise, each personality database or theme may be invoked or modified in response to stimuli external to the database.

The alterable database may also cause one or more flags to be set. These flags may result in a limit to the operation of the apparatus, a limit to the operation of the applications, or an alteration of information referenced by the alterable database.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
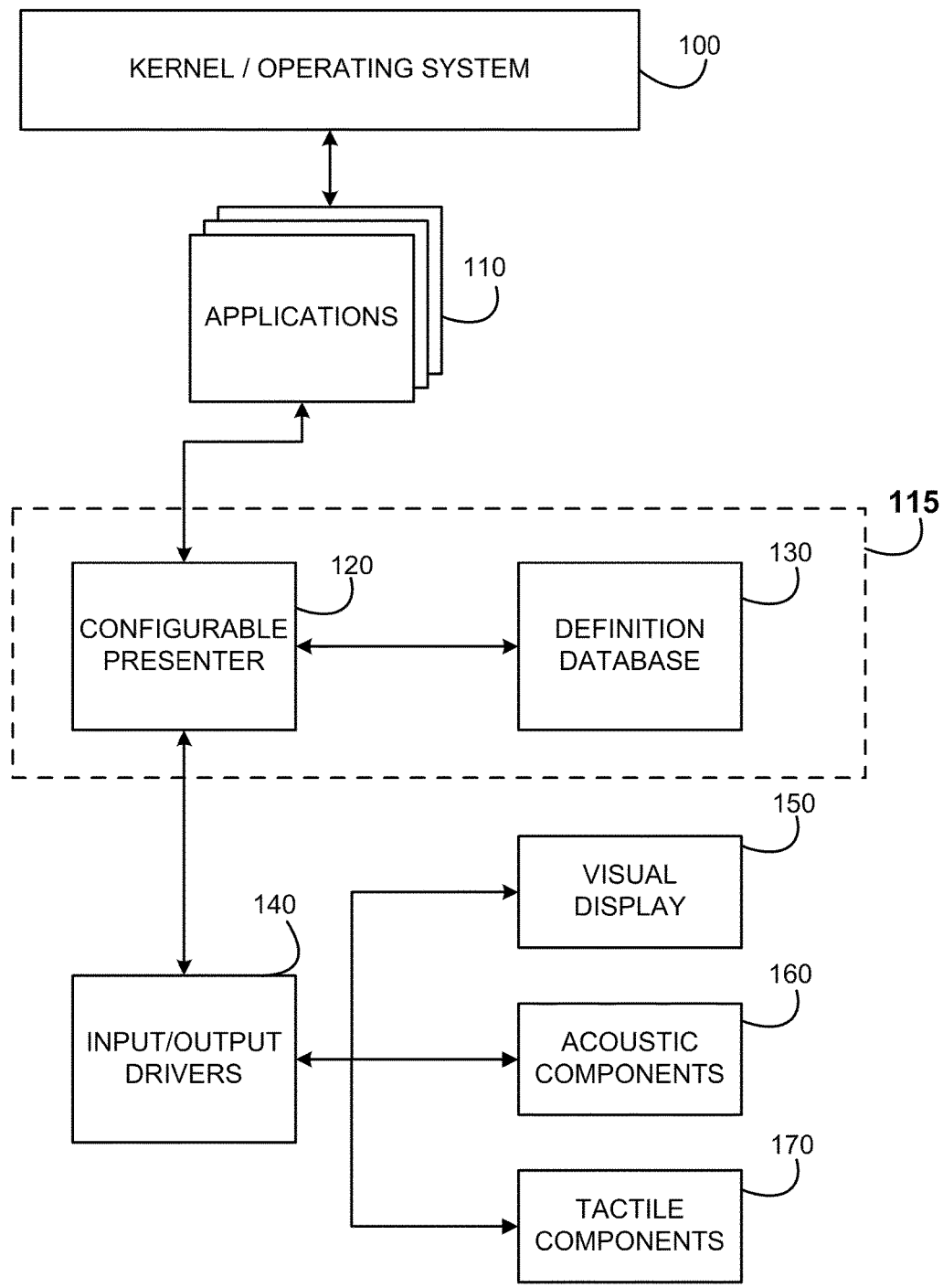
FIG. 1 is a structural block diagram for an example of a user interface control system in accordance with an embodiment of the present invention.

The present invention will be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates generally to systems and methods for controlling a user interface to enable configurable run time customizations. In particular, the present invention is directed to novel methods and systems for user interface personalization which offers flexibility to manufacturers and allows a user to see the results of changes immediately without the delays and difficulties that attend compilation and embedding processes.

Of note is that, in the remainder of this application, particular attention will be placed upon visual displays on a portable personal appliance. It is important to realize that the present invention may apply equally well to all manner of consumer electronic devices including, but not limited to, computers, tablet computer systems, e-reader devices, kitchen appliances, digital music players, media players, digital watches, cameras and virtually any electronic device which includes an interface. In addition, while a visual interface is described in great detail, the present invention is entirely capable of operation with a wide range of interface types, including any combination of a visual display, tactile and audio output and a visual, tactile or acoustic user interface (UI).

The present application for letters patent describes an intermediate Configurable Presenter which interposes between an operating system (OS) of the portable personal device and the user interface. The portable personal device may also be known as simply a device or an appliance.

This provides flexibility for a manufacturer, service provider, if any, and of course the end user. By using an interpreter or some functional equivalent embedded in a virtual machine, run time operation can be accomplished and allows a user to see the results of changes immediately without the delays and difficulties that attend compilation and embedding processes. A manufacturer may enjoy extensive re-use of an existing OS (operating system) or Kernel and any associated applications and treat the UI design and implementation as a truly separate activity within the context of the appliance. Insomuch as the UI itself is concerned, this may be provided through the use of an intermediate Configurable Presenter, 120 in FIG. 1.

An application developer need only consider the functionality of the application and UI operation in the context of the appliance or device may be determined later. More specifically, neither the appearance of any output data nor the mechanism of entry of input data need be considered at this point, rather the UI may be developed in comparative isolation. Appliances may thus use a common application code base yet need share no common UI aspects. Although there may be an efficiency penalty in that carefully structured code may be compiled to a very compact memory footprint, this often renders an implementation unique and does not normally account for post-compilation changes beyond a few selectable and pre-defined options.

The Configurable Presenter Subsystem may be used to handle data from the application and present it to the user and may handle input events and provide them to the application. Interaction between the Configurable Presenter 120 and underlying applications or Operating Systems 100 may be achieved using an Application Programming Interface which may provide convenient connectivity between the Configurable Presenter 120 and the rest of the appliance. These interactions may be provided unconstrained by the application, such as a fixed predefined output format being replaced by one more appropriate to the appliance or to anticipated user preferences. The Configurable Presenter 120 may transform or manipulate data using a set of configuration files which files may be simply altered by a user. Such transformation or manipulation may include changing data attributes such as color, size and orientation or it may provide sophisticated, device-context transformations based on time, location or current device status; for example, battery charge level or ringer alert style may cause a change in the way that information is presented to a user. The data handling may be static, quasi-static or dynamic in nature and this nature itself may be alterable dynamically. For example, the data handling may be dynamic based upon services being offered or may be keyed to time considerations, such as changing or moving an icon with every time interval.

Additionally, the Configurable Presenter Subsystem may add new or hidden UI elements to improve the user experience or remove elements that are superfluous depending on the status of the appliance.

In addition to handling the appearance of elements, the positioning and layout of visual UI elements may also be handled by the Configurable Presenter 120. The Configurable Presenter 120 may also handle aspects of acoustic or tactile information. UI elements may be modified by the system, including scaling, positioning or the addition of animation, visual or acoustic or additional components. Elements may be enhanced by effects, such as dynamic addition of shadows, reflections or highlights (which may, themselves, be alterable). Where acoustic components of the UI elements are altered, these may include echoes and reverberations so as to create the acoustic perceptions of depth and breadth. Tactile interaction of the UI may incorporate vibration devices or acceleration sensitive devices as well as physically changing device properties. For example, certain keys on a virtual keyboard may be enlarged if they are preferred, whereas the appearance or resistance to motion of a physical key may be changed by lighting or extinguishing an embedded light emitter or altering spring tension electro-mechanically.

The application may specify attributes that the Configurable Presenter 120 should not change, in order that any regulatory, service or product requirements may be complied with. For example, if a text field is required to have a mandatory background color to signify an urgent condition then the Configurable Presenter 120 may respect the protected attribute and limit the extent of interaction available. This may be achieved either directly by interaction with an application or by tagging certain data within the Configurable Presenter's data definitions.

The Configurable Presenter 120 may also adjust the appearance of UI elements based on the properties, existence or lack of other UI elements. For example, a set of checkboxes may modify their position to align themselves with each other, or the colors and images may be modified to improve contrast based on the current background. If battery power is low, then the choice of contrasting color may be altered so as to minimize appliance based lighting. Similarly, ambient lighting may be detected and responded to in a way that improves user perception of displayed data.

The Configurable Presenter 120 may perform its functions in accordance with thematic information that may be held in a separate store. This thematic information may be stored in a memory. In one implementation, by using a script language format, thematic information may be stored as text and may only be limited by the available memory size or allocation. The information stored may be altered or added to at any time and the Configurable Presenter 120 may interpret this stored information which may then govern the actions of the Configurable Presenter 120.

The Configurable Presenter 120 may maintain tables or lists which reference objects stored in the thematic information store. Each time a change is made which adds an object to the thematic information, the Configurable Presenter 120 may supplement its data and may record information relevant to locating this added object along with certain other information. This may enable the Configurable Presenter 120 to locate the object within an information store without having to read the entire store. In this way, a function governed by an object in the store may be exercised without unexpected delay in locating the object.

Below is provided a number of example systems and methods of user interface control. For the sake of clarity, multiple subsections with corresponding headings are provided. These subsections are provided solely in the interest of clarity and are not intended to limit the present invention in any manner.

I. User Interface Control System

FIG. 1 provides a structural block diagram for an example of a user interface control system in accordance with an embodiment of the present invention. Such a system may operate on a portable personal device, appliance or any other consumer electronics device. The platform or the core of the appliance is defined by the Operating System (OS) 100 which organizes machine resources such as the amount of memory and the amount of time which should be assigned to various tasks that the machine must perform. For example, in an appliance such as a phone, it's essential that responses to the service network are prompt and not delayed by user tasks such as writing a message. The operating system provides this scheduling and ensures that real time demands are met before tasks that are relatively time insensitive are serviced. In earlier appliances, the task list would have been relatively small and the controlling software or firmware often dedicated without significant sharing of subroutines, this is more often referred to as a "kernel". The kernel is usually considered to be the lowest level of abstraction upon which an operating system may be based and many kernels may operate in close-to-real time.

Applications 110, being a higher level of abstraction than the OS 100, are those programs or elements of an appliance which deal with specific tasks. In the telephony example discussed above, these Applications 110 may include a dialer program or an address book, for example, with which the user interacts directly but through a component referred to as the User Interface or UI. The purpose of the UI, also referred to as the "man-machine interface," is to bridge the gulf between the way a machine represents data and the way that human users prefer to interact. For example, when a user enters information, there is a desire to see the information being entered simply to produce a level of comfort that the correct information is being acted upon. It also needs to be arranged so that it is familiar to a user and big enough to be easily seen. All of these factors are referred to, in the vernacular, as "usability".

The applications 110 normally deliver information to and receive information from the components of the UI. This may be from physical pieces of the appliance which are specifically configured to be useful as user interface components, such as a screen, a loudspeaker or earpiece and a keyboard of some description. Other UI interface hardware may include a blue tooth adapter or other signal receiver, touchpad, stylus input, finger scanner, accelerometers, compass, vibrator, or any known, or future known appliance interface mechanism. Broadly, these interface components may be subdivided into Visual Displays 150, Acoustic Components 160 and Tactile Components 170. However, as noted above, additional interfaces are considered which do not readily fit within any of these three illustrated UI components. These additional interface types are omitted from the figures to aid clarity.

Figure 2A:
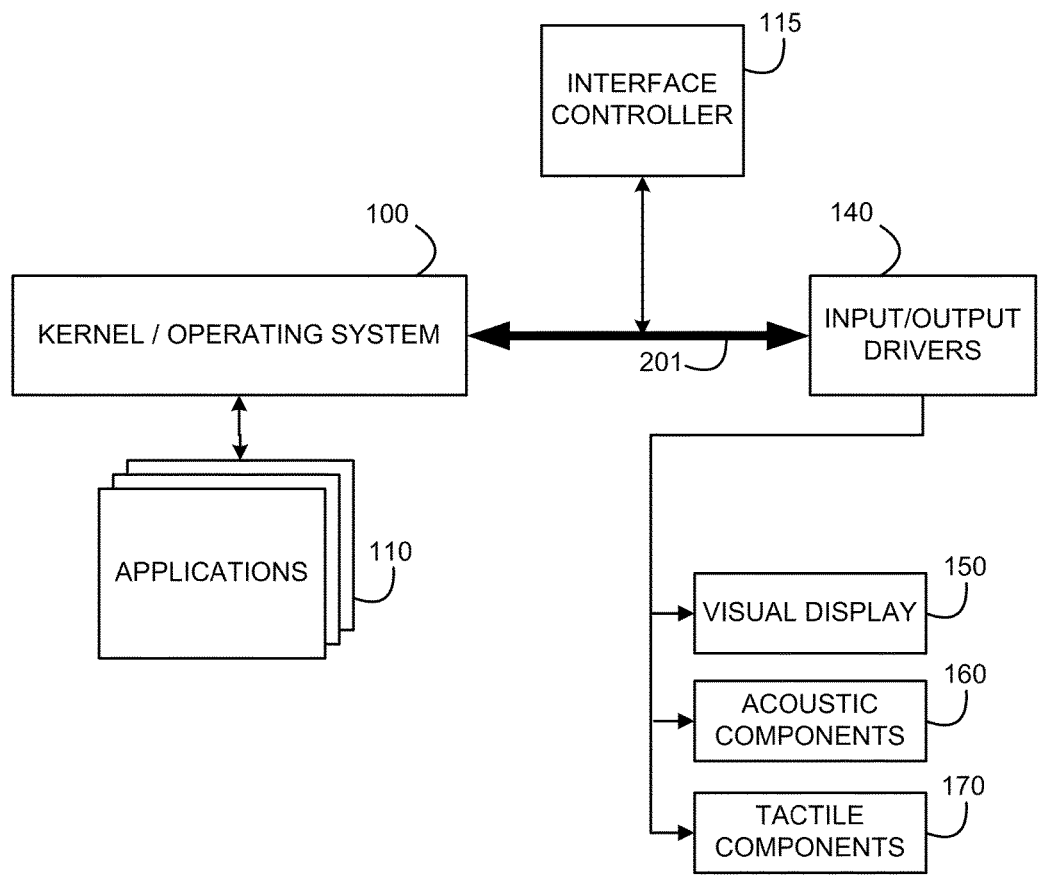
FIG. 2A is a logical block diagram for data linkage arrangements in one embodiment of the user interface control system.

Due to of the inherent complexities of these latter physical components, requirements for voltages and currents that differ from the usual logic levels may be found within modern programmable machines, the details of their operation may be handled by some Input/Output Driver 140 which is entirely dedicated to operating these components. In this way, connectivity to the physical world may be a resource that can be shared by many applications and these drivers may be a part of the OS itself or may be separate elements. FIG. 2A shows a typical arrangement and the data linkage is shown as line 201.

As is known by those skilled in the art, since a Driver 140 performs relatively well defined tasks, information transacted with a driver can be data that is placed in and read from a buffer without any further interaction on the part of the application. This information may contain data representative of the actual material to be output along with extra data that may instruct the driver to handle the output material in a specific way. For example, a text string to be displayed may be supplemented with additional information that causes the text to be shown in some particular font and size. In a typical appliance, a user may be limited to one of a small number of presentation options which are pre-programmed into the driver, such as the choice of one of three font sizes.

In some embodiments of the present invention the Connection 201 between the application and the buffers from which the Input Output Drivers 140 take their instruction may be severed and a Configurable Presenter 120 may be interposed in between the Applications 110 and the Drivers 140. This may be clearly seen in FIG. 2B which shows a logical block diagram for the interposition of a configurable presenter between an application and input output drivers.

The Configurable Presenter 120 in conjunction with one or more Definition Database(s) 130 form one embodiment of the User Interface Control System 115. The Configurable Presenter 120 may then become a proxy for the UI process. The Configurable Presenter 120 may, in some embodiments, exchange information with the Application 110 and the physical device's Input/Output Drivers 140. The Configurable Presenter 120 may be transparent to some information in that it simply relays information without alteration. In other cases, the Configurable Presenter 120 may be opaque to information flow and information may be transformed quite completely. The opacity of the Configurable Presenter may be entirely controllable by stored information. The function of the Configurable Presenter may be defined entirely by thematic information stored in the Definition Database 130 which may store the rules by which the Configurable Presenter 120 governs information flow. Data storage may be in any of a number of forms and, as is well known to those skilled in the art, in one embodiment it may be represented as a text file. Likewise, tabular, matrix and compressed storage may be considered in some embodiments.

In typical appliances, the device Drivers 140 comprise components that may be programmed to cause a Display or touch screen 150, Acoustic Components 160 and/or Tactile Components 170 to provide information to and receive information from a user. Examples of this would be a touch screen (combining both the display and tactile elements) where data is displayed and the position and action of a pointing device such as a stylus or a finger are returned. The conversion of pointing device activity to input data is well known in the art. In another embodiment, acoustic drivers supplement the implementation and audio information may be routed by the Configurable Presenter 120 to this component. Tactile information may be vibration or pulsing that may be used to cue operation where the acoustic environment prevents audio cues from working well. In another implementation, Braille information may be output by the movement of sensor pegs.

Figure 2B:
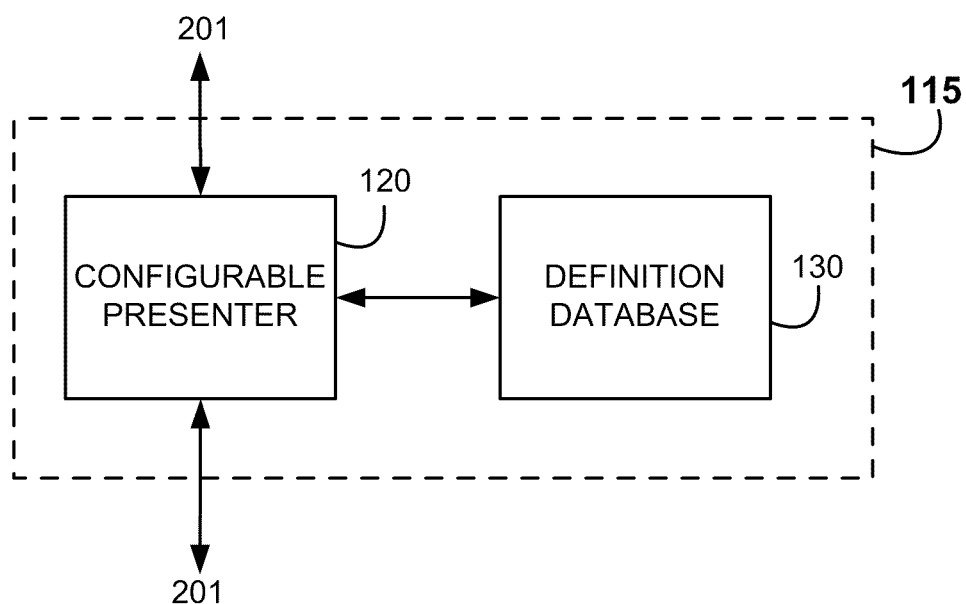
FIG. 2B is a logical block diagram for the interposition of a configurable presenter between an application and input output drivers in one embodiment of the user interface control system.

FIG. 2A is a logical block diagram for data linkage arrangements in one embodiment of the User Interface Control System 115, and FIG. 2B is a logical block diagram for the interposition of a configurable presenter between an application and input output drivers. This interposition requires both a physical connectivity to the Appliance, as well as logical protocols incorporated into the connection. Interposition of the User Interface Control System 115 is selective in the data which it intercepts and modifies. This selectivity may rely upon tags and alerts which indicate what action the User Interface Control System 115 should take in regards to any given data prior to delivery to the Drivers 140. More details regarding this selection process are provided below.

Figure 3:
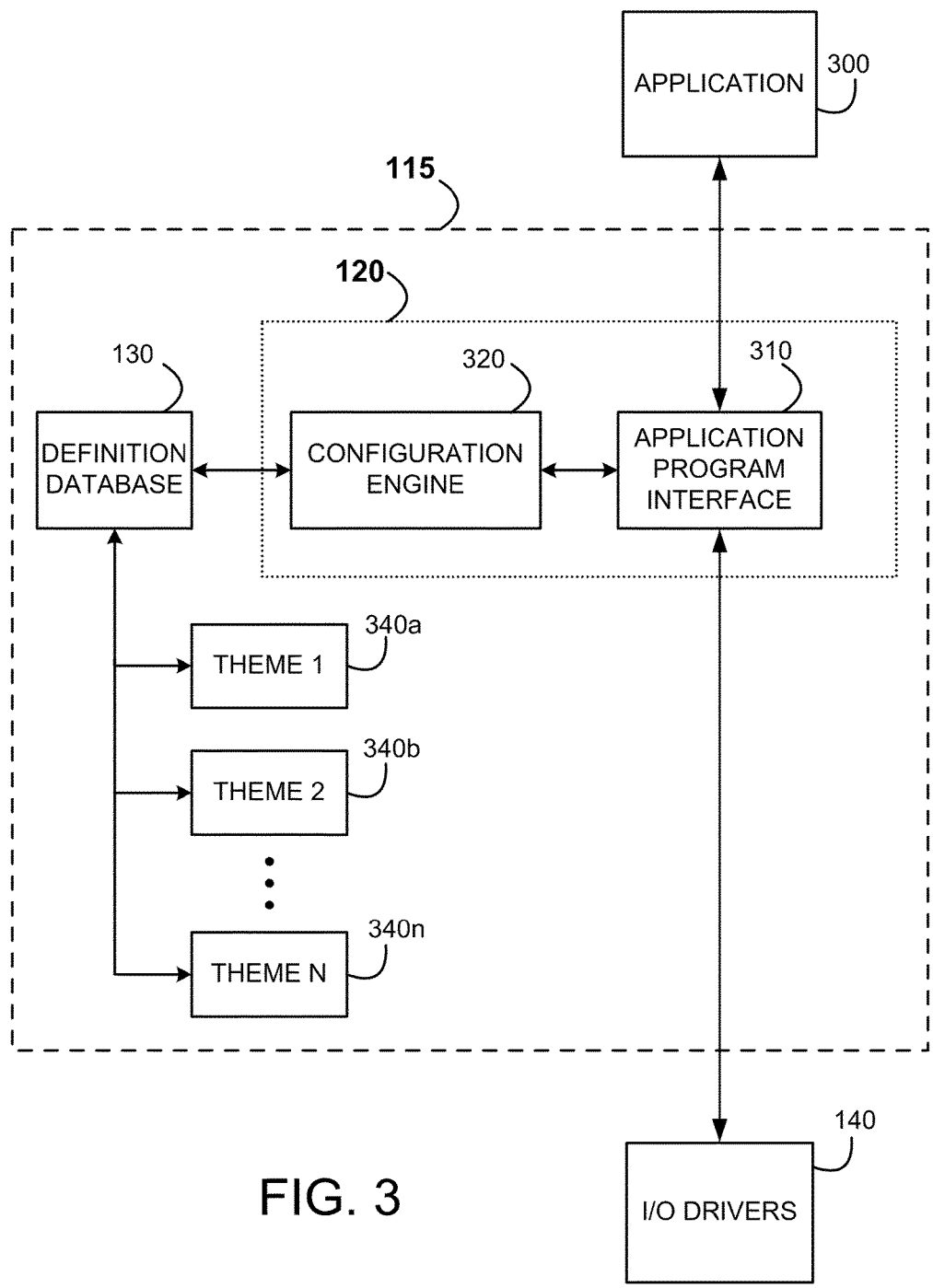
FIG. 3 is a logical block diagram for defining an application programming interface in one embodiment of the user interface control system.

FIG. 3 is a logical block diagram for defining an application programming interface in one embodiment of the User Interface Control System 115. As noted above, in order to allow messaging to take place, more than a physical connection is needed; the protocols which define message exchange may be incorporated into the connection in some embodiments. This is achieved by defining an Application Programming Interface (API) 310 which documents the message structures, message protocols and the results. The Application Programming Interface (API) 310 along with a Configuration Engine 320 may be parts of the Configurable Presenter 120. In order for successful incorporation of the invention, it is suggested that the API 310 be properly serviced from the point of view of both the incoming data and the outgoing data. Knowing the existing protocols between an Application 300 (of the plurality of Applications 110) and the I/O Drivers 140 enables a manufacturer to implement this invention without the involvement of the Application or OS developers. Of course, an application developer may be able to add features to the application which take advantage of the Configurable Presenter 120 in some embodiments.

As noted above, in some embodiments, the API 310 may contain message protocols that enable the Configuration Engine 320 to interact with data between the Applications 110 and the Drivers 140 to varying degrees. In some embodiments, this level of manipulation may be sub-divided into three interference levels: i) invoke the Configuration Engine 320, ii) permit the Configuration Engine 320 to interact and iii) prevent the Configuration Engine 320 from interacting. In this last instance, in some implementations, the API 310 may appear transparent to the data. In this case, data received by the API 310 may simply be repeated, thus resulting in a slight time delay, but otherwise not altering the data in any way.

II. Methods for User Interface Control

Figure 4:
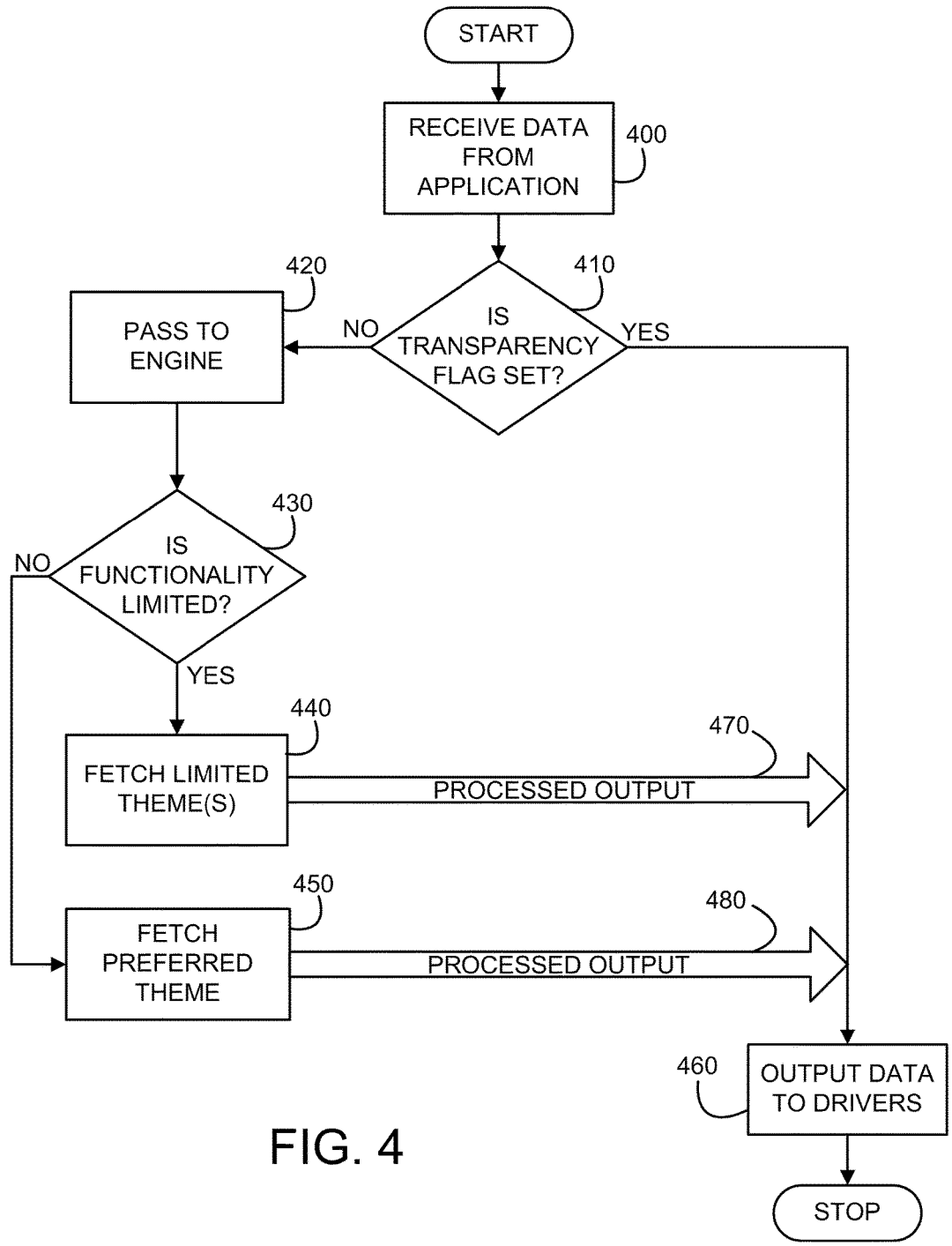
FIG. 4 is a flow diagram for data manipulation by the Configurable Presenter in one embodiment of the user interface control system.

FIG. 4 more clearly illustrates the method of selecting a particular interference level by providing a flow diagram for data manipulation by the Configurable Presenter 120. This flow process is provided by way of example and is intended to be a simplified process for clarification purposes. As such, the process provided by FIG. 4 is purely illustrative and does not limit the functioning of the API 310.

As seen in FIG. 4, after the process begins, the data may be received from the Application 300 and may be stored in a buffer temporarily, as is shown in step 400. The received data may be inspected to see if any conditional flags are set at step 410. As noted above, these flags contained in the data may be utilized to indicate the extent and nature of the processing of the data by the Configuration Engine 320. Flags may include transparency flags and limitations on functionality. If a transparency flag is set then, in some embodiments, the data may simply be read from the buffer and sent directly to the drivers, at step 460, for the I/O function. However, if at step 410 the data is not restricted in this way (no transparency flag), then the process may progress to step 420 where the data may be passed to the Configuration Engine 320 which is the data manipulation element of the Configurable Presenter 120.

Then, at step 430, another inquiry may be made to check if any flag condition exists which indicates an application restriction. In addition to any preset restrictions on the data, appliance status or condition may be factored in to the decision process to see if there is some limitation on functionality. For example, power restrictions or time limitations may be included in the decision whether to limit functionality.

Responsive to the functionality test, either a full enabled theme may be fetched from the definition database, at step 450, or a limited theme may be selected, at step 440. In some embodiments, only one of the three possible results can be passed, at 470 or 480 respectively, to the I/O Driver at step 460.

As an example of restriction based upon device condition, in some embodiments the user chooses to display text as white lettering on a blue background under normal circumstances. In low power conditions, however, the color scheme may be transitioned to yellow lettering on a purple background. This high contrast enables screen backlighting to be reduced and lowers overall power consumption. Thus, instead of applying the preferred settings (white on blue), a limited setting may be applied instead (high contrast yellow on purple).

As an example of a time restriction on data manipulation, consider a traveling user who has arrived in a country whose time zone is different than the original location. If the appliance is time aware, then this information may be used to moderate the theme which might be specified. If it is now late at night, the alert tones may be conditioned to operate at reduced volume and the display restricted to partial intensity. By contrast if it is mid day, then the display intensity may be set to full brightness and the ring tone set to a more appropriate level for the circumstances. In one implementation, the acoustic input may be monitored and used to dynamically alter the alert tone for volume and cadence.

Referring back to FIG. 3, the Configurable Presenter 120 may access any or all of the Definition Database 130. The Definition Database 130 may, in some embodiments, be segmented so as to comprise one or more Themes 340a to 340n. In this way personalization may be shared between several users or may simply be incarnations of a single user's personalization. Access may be controlled by the use of a Key. The Key may be used to allow or deny access to any or all of the database and permits users of a shared appliance to operate it using their personality theme without affecting its use by another. This access may also serve to limit the extent of the Configurable Presenter 120 data transformation capabilities so that a plurality of pre-stored transformation rules may be created and re-used but ensuring rule conflicts or incompatibilities that arise either from careless or intentional operation may be prevented.

Figure 5:
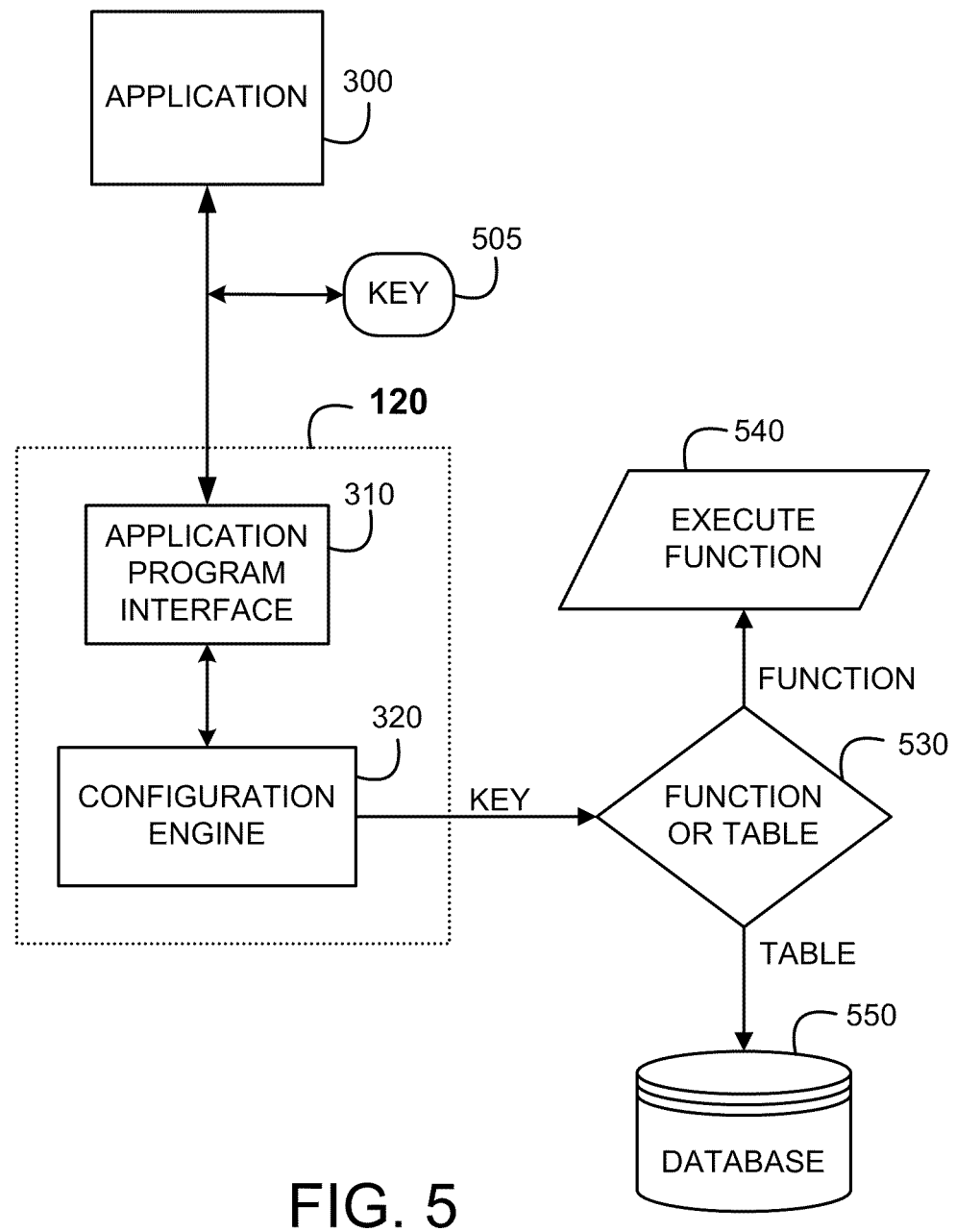
FIG. 5 is a logical block diagram for key based access to at least one definition database themes in one embodiment of the user interface control system.

FIG. 5 is a logical block diagram for key based access to at least one definition database themes. In some embodiments, Keys may be predefined. A key may also have a type and in some embodiments, the key type may be either a Table or a Function. When the Configurable Presenter 120 accesses the database with a key, the type of the key may be examined. If the key type is Table, then the data refers to a second database that contains other information. If the key type is Function, then this instructs the Configurable Presenter 120 to execute that particular function. The Key may be generated locally by the Configurable Presenter 120 or may be assigned at the application and is a simple design choice. The Application 300 passes data containing the Key 505 to the API 310. The API 310 may separate the data and the Key 505 and pass this to the Configuration Engine 320 which may use the Key Type to determine the next action to be performed using the data received. If the Key 505 is a Function type, determined at 530, then the engine executes the function retrieved acting upon the data received from the application, as shown at 540. If the Key type is a Table type, determined at 530, then data is retrieved from a second Database 550 and incorporated with the data received from the Application. This may modify the Application data and may change its appearance or structure. An example of a function may be seen when a user enters a digit string and the digit is shown as a large font for a short period after which it is moved to the next vacant position in a text string and diminished in size. In this case the function might be "show literal large, start timer, on time out shrink literal to medium, measure distance to string end, move literal half way, shrink literal to small, place literal at string end." This might give the pleasing display of an easily visible digit for confirmation, followed by its smooth reduction and addition to a string which might then be used to dial a number. Another example of a function in the dialer context might be the movement of an artifact resembling a magnifying glass over each digit in a dialed string, in turn as they are dialed and causing each digit to be temporarily increased in size. A function may be used to good advantage in examples when the data is variable and its arrangement is a prepared structure.

In the case of Key Type=Table, where the represented data may be stored as a table, the table entries may be value tuples that may be associated with a key which may then be returned to the application. These value tuples may be used by the Configurable Presenter 120 to establish or modify the parameters of items that may be provided to or received from the Drivers 140 such as Visual, Acoustic or Tactile signals. A table may be used to advantage in examples where the machine value of a key is to be changed. Consider the use of a 9 key numeric keypad for a simple application that requires a cursor to be moved or directed around a screen. In the case of a simple shooting game, the center key (normally the 5 key) might be designated as the fire button and the surrounding keys assigned movement attributes for the sighting mechanism. Here, the literal values are meaningless and a table might be useful to convert the 4 key to a value tuple that causes the sight to be panned to the left. Similarly the keys might represent musical notes in a diatonic scale and in this case the value tuples might represent frequencies that may be programmed into an audio oscillator. These table defined items may then be presented to the user of the appliance as displayed screen items or as audible information or in tactile form. An example of tactile data could be as simple as a vibration, or may be more complex, such as a Braille signal. Tactile input data may be acquired from accelerometers and may allow actions to be governed by finger taps other than on a touch sensitive screen. For example, a finger tap may be used to signal an acknowledgement without regard for position on a screen. In one implementation, a flag may be assigned to determine whether a function or table treatment is intended and a single bit may be used to switch from one to another. For example, if the bit is zero valued, then a table may be intended but if it is a one, then a function may be intended. If other operations are defined, then a four bit structure can define 16 possibilities and is well known in the art.

III. Examples

The following discussions and references to figures are provided to illustrate a set of examples for some embodiments of the present invention. The examples may include particular limitations which are unique to the given example and are not intended to extend to the invention as a whole. Likewise, some examples have been simplified in order to aid in clarity. It is understood that while the foregoing examples aid in explanation and clarification of the present invention, these examples do not limit the scope or function of the present invention.

Returning briefly to FIG. 3, the operation of the Customization Engine 320 may be controlled at least in part by the Definition Database 130. The Definition Database 130 contains information which may be stored in any of a number of ways well known by those skilled in the art. For convenience of illustration this may be considered as a simple linear list, although structured lists or tables may be more convenient in some implementations. The Definition Database 130 is illustrated as including a plurality of Themes 340a to 340n. In some embodiments fewer themes may be utilized, however, in situations where the appliance is shared among various users, or in situations where a single user chooses to have multiple personalization schemes, more than one theme set may be advantageous.

Figure 6:
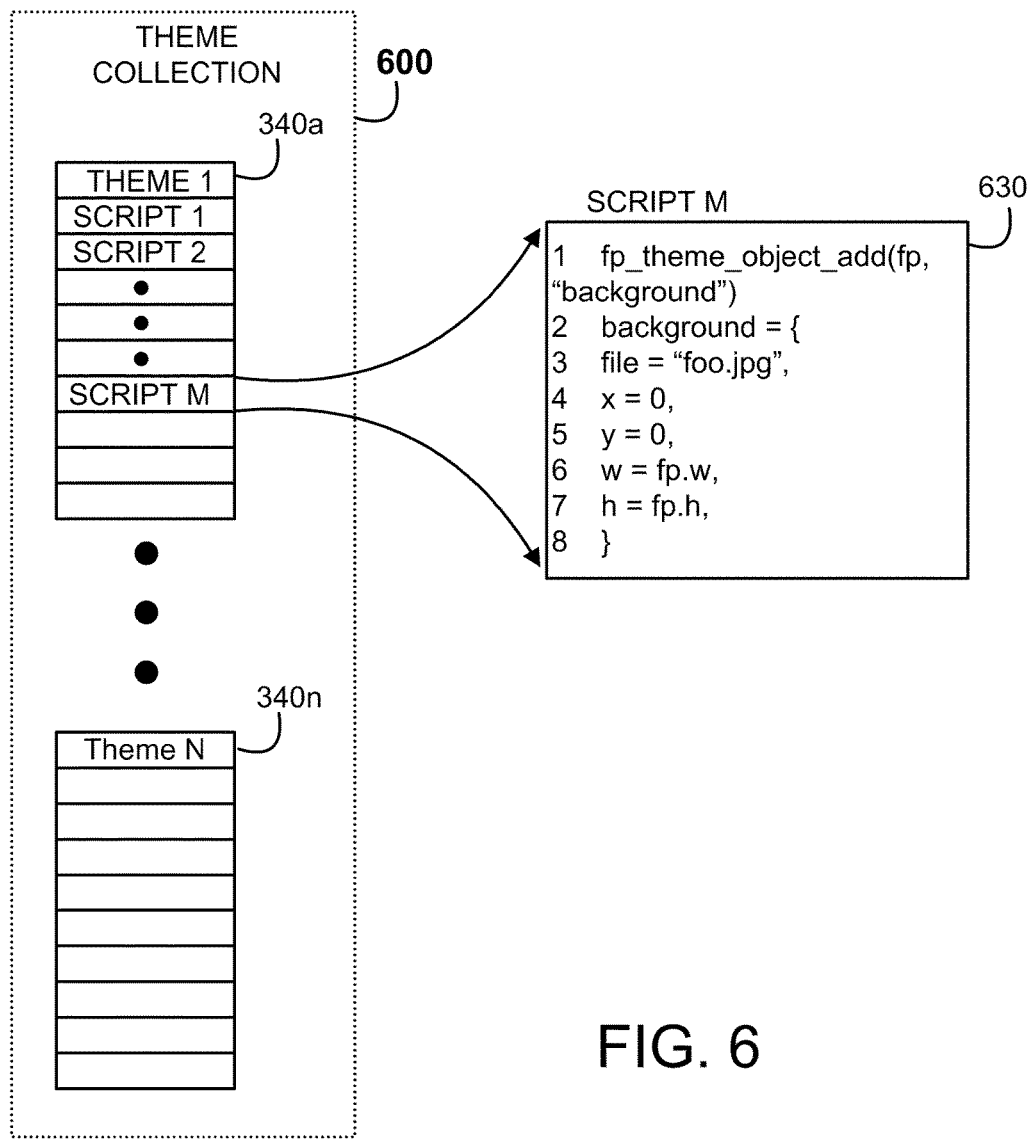
FIG. 6 is a structural block diagram for a definition database including more than one theme in one embodiment of the user interface control system.

FIG. 6 shows a simplified example of one implementation where the definition database contains one or more themes in a theme Collection 600. In this example, each theme may contain one or more scripts. Each script comprises one or more elements or lines. Script M 630 shows an example of a sample script contained in a Theme 340a in the theme Collection 600 in the Definition Database 130.

Taking this example of Script M 630 which is simplified for ease of reading:

```
fp_theme_object_add(fp, "background")
background = {
file = "foo.jpg",
x = 0,
y = 0,
w = fp.w,
h = fp.h,
}
```

Figures 7A, 7B:
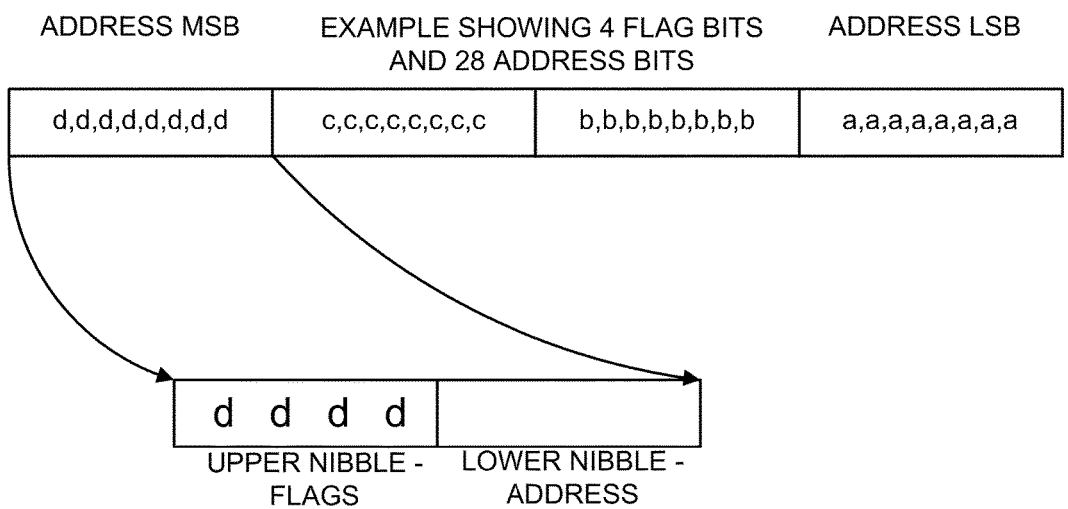
FIG. 7A is an illustration of a record table in one embodiment of the user interface control system.
FIG. 7B is an illustration of a key type incorporated into an address in one embodiment of the user interface control system.

The first script line causes the Configurable Presenter 120 to create (add) a record of an object named "background." This record may be stored in any of the means known in the art; for example this may be as a list or, as shown in FIG. 7a, in a table. The stored information structure may contain a Name Record 700, a Specific Address 710 that directs the Configurable Presenter 120 to access the script at a suitable point when the item "background" is called, as well as any Key Type data. If a key type is supplied by the Application 300, then the stored Key data may be ignored. The Address 710 may be a pointer to the data store containing the script. In this example, the pointer to the address 0x yyyy would start the interpreter reading at the second line of the block where the definition of "background" actually begins. The Key Type may be conveniently incorporated with this address simply by reserving the upper few bits of the address for this purpose, as is shown in FIG. 7b. Here only the leading digit is required to be saved if there are only two types, and reserving the upper nibble would accommodate up to 16 types. If this record is stored as a table, related attributes may be stored in the same table and a group of Pointers 720 may be stored in the table that allows the related objects to be located. For example, if an application typically has a thematic profile that has use for several of the listed objects, the storage order may be arranged so that these objects may be grouped together. In this way, speed may be improved by reducing the time taken to read through sequences of objects. In another implementation, the key may relate to a hash table which is well known in the art. Reference is made to Knuth, "The Art of Computer Programming" vol 3, ISBN 0-201-03803-X Searching and Sorting, sec. 6.4 "Hashing"

Flag data that is recorded may include information about related objects and their status, as well as, information concerning the status of the appliance. It will be appreciated that, although in simple cases it would be possible to associate objects by simply manipulating their location in the table, in more complex cases, it may be necessary to store the location of related objects. Flag data may be unique to the object it concerns and the net effect on the aggregate task may be determined algorithmically once all related objects have been parsed. These kinds of problems and their solutions are known in the art and such methods are described extensively in "The Art of Computer Programming" Knuth, Volume 3, Searching and Sorting. Where frequent associations are found, it may be economic to maintain separate tables each containing only related objects and determine which composite table to use from the context of the activity.

Returning to FIG. 6, the interpreter finds that "background" references a file named "foo.jpg" (Script M 630 at line 3) and sees that this file is an image file (the .jpg is an image file type extension) which is to be located at the x,y reference point 0,0 (Script M 630 at lines 4 and 5) and scaled to a width 'w' and a height 'h' (Script M 630 at lines 6 and 7). The closing brace "}" (Script M 630 at line 8) terminates the description of the object "background".

In this way, each script block in the theme may contain a single personalization component. The extent of the script is limited only by available memory and since this may be separate from the memory that the appliance uses to maintain its basic function, may have no adverse impact on the OS or the applications. However, if the script causes the Configurable Presenter 120 to undertake computationally intense actions then this may consume more resource than available at any one time in the same way as any other extensive computational effort.

A more sophisticated theme-element example may now be appropriate. Consider the sequence:

```
function background(img)
    img:theme_image("background.png")
    img:resize(fp.w,fp.h)
    img:fill_set (0,0,100,100)
    img:show( )
    img:move(0,0)
    img:layer_set (-100)
    return true
end
``` which selects the image "background.png" and then resizes it to be the size of the screen. It sets the fill process and then makes it visible (the 'show' command) to the user. The image is then moved to the origin which in convention is the top left of the screen. The image may then be assigned a "layer value" which determines where it should be placed when there are several other elements on the screen. Higher values are moved to the foreground and lower values lie below them. In the manner known in the art, this causes images to obscure images beneath them and so appear like a paper pile. The function terminates after returning a value of "true" to indicate that a successful outcome was achieved. A theme may be composed of many such elements, especially for the more complicated situations such as setting a required background and imposing an inset background for one or more other features For example:

```
function background(img)
    img:..................
function text_entry_background(img)
    img:theme_image("TextEntry/textentry_background.png")
    img:resize(fp.w,fp.h)
    img:..................
function slider_h_bar_right (img)
    img: theme_image("Slider/sliderbackground1.png")
    img:border_set(0,10,10,0)
    img:..................
    .....................
    return true
end
```

When the Definition Database 130 contains multiple elements resulting in multiple related objects, a further advantage may be realized by allowing objects to be combined or expanded. For example, in one implementation several objects may be consolidated to result in one single output in some cases and may be shown as separate individual objects in other cases.

As noted above, the present interface control system may be event driven, and events may generate callbacks in application code. Many non-trivial programs make use of callbacks or their equivalent in some way. Callbacks can be generated for a variety of reasons. Some may be synchronous with other events in the application, others may be generated from user events, while yet others may be a result of network or other activity. A Callback is a familiar construct in the C programming language and well known in the art.

Timers and I/O watching file descriptors are usually the most common events generating a response from the User Interface Control System 115. However, here a number of other events may generate activity from the system, including jobs, animators, signals and idlers.

Timers may be one of the most common callbacks in the system. Simple animations, transitions, time-outs, counters and many other effects can be implemented using timers. Repeated events are a frequent requirement in many programs. Generally when used in a repeated manner some sort of state may be stored for each call to keep track of what is happening. Once the objective has been achieved, the timer may delete itself, and its data.

Another extremely common event which may result in the system manipulating the user interface is input or output signals, as discussed above.

Figure 8:
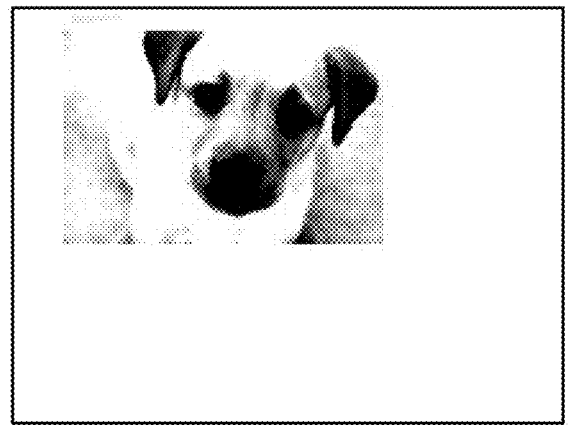
FIGS. 8 to 15 provide various screenshot examples of image personalization using one embodiment of the user interface control system.

FIG. 8 illustrates an illustration of a screenshot for an example of displaying an image utilizing the User Interface Control System 115. One of the most powerful tools of the present invention is its ability to display and modify colors, texts and images. The example in FIG. 8 displays an image at its native sizing. The script associated with this action may include:

```
img:theme_image(" puppy.jpg")
local s = img:size_get( )
img: resize(s.w,s.h);
img: move(20,10)
img: show( )
```

Thus, the image is set to "puppy.jpg" which is a recognized image file. At line 2 of the script, the native height and width of the image file is determined. The displayed image is then resized to 'w' and 'h' which is the same as its native size. The image may then be positioned to an horizontal position of '20' and a vertical position of '10'. The last line of the script may then display the image on a visual interface by sending the data to the Driver 140.

An image object has its object width and object height within the graphical interface, while an image from a file also has its image width and image height. If the size of the image object to be displayed on the interface is larger than the image file's width and height, the image will be displayed on the screen scaled up. Likewise if the size of the image object is smaller, the image will be displayed scaled down. What has been done in the example above at FIG. 8 is the image has been resized in the display to the same size of the image file dimensions.

Figure 9:
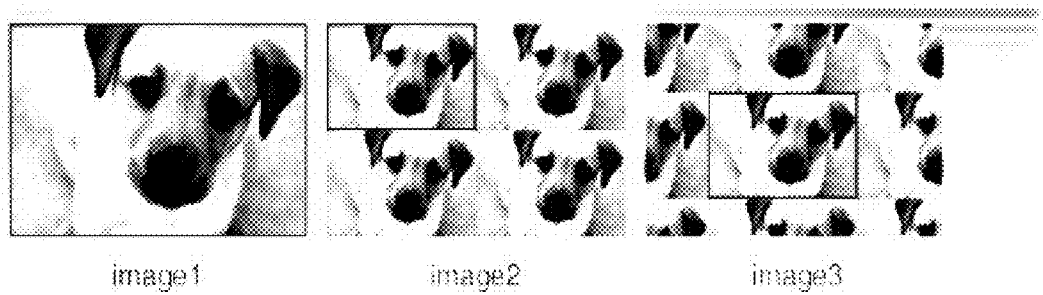

Continuing the example, FIG. 9 displays the same image in a fill and tile manner. The function evas_object_ image_fill_set enables a user to specify the region to be tiled around. Thus, for image 1 of FIG. 9, an appropriate script may include:

evas_object_imagefill_set(image1, 0, 0, w, h);

which sets the fill region from (0, 0) of the object, with the width and height of the size of the object. Therefore only one image is displayed within the object. Image 2, on the other hand, may include the line:

evas_object_imagefill_set(image2, 0, 0, w/2, h/2);

which sets the fill region from (0, 0) of the object, with the width and height of half the size of the object. The image is now tiled around that region. As the region is half the size of the object, the image rendered four times within the image object. Lastly, image 3 may be produced utilizing this script line:

evas_object_imagefill_set(image3, 32, 32, w/2, h/2);

which sets the fill region from (32, 32) of the object, with the width and height of half the size of the object. The size of the image being rendered is the same as image 2. However, the fill region rectangle is now at (32, 32). Thus, image 3 is like image 2 but everything is now shifted to the right and to the bottom by 32 pixels.

Figure 10:
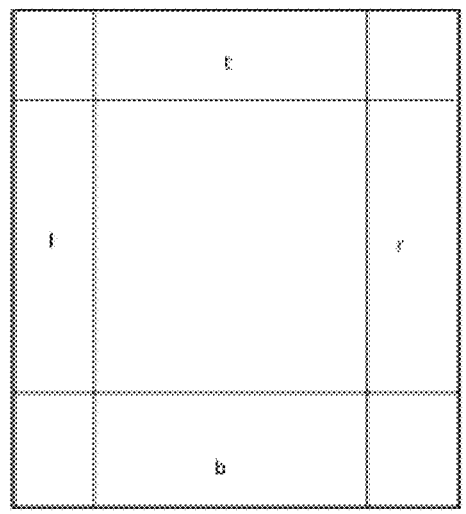

Continuing to FIG. 10, it is not uncommon to have border properties on an image that cannot, or should not be scaled arbitrarily. For instance a bevel or highlight on the side of an image. This region is known as the 'border'. Borders may be controlled utilizing this script call:

```
void evas_object_image_border_set(Evas_Object *image,
    int I, int r, int t, int b);
```

The use of border essentially splits the image into nine regions, a central region, four corner regions and four edge regions. This is illustrated in FIG. 10. The letters in the diagram indicate which region the four parameters of evas_object_image_border_set control, with the 4 corner regions being controlled by their two neighboring edge regions.

Figure 11:
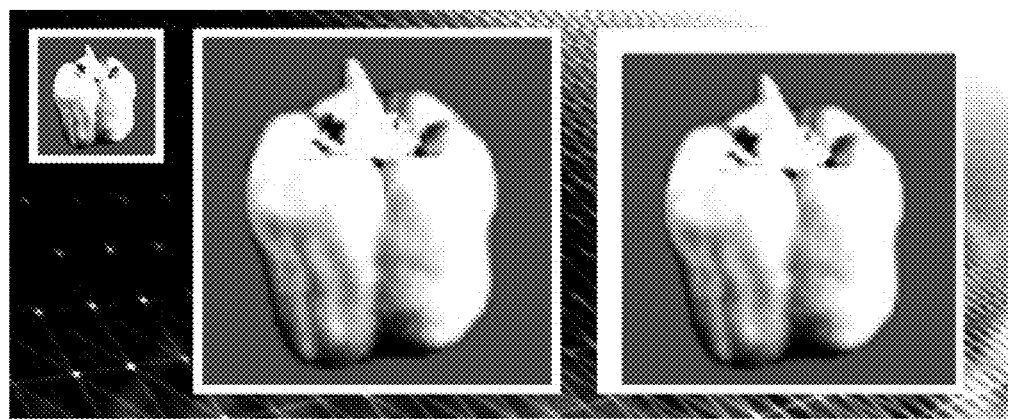

FIG. 11 provides an example of a script using image border properties. The first image on the left is the source image at its natural size. The second is the image scaled to 200 pixels and the borders on all 4 sides set to 5 pixels, so while the center of the image has been scaled, the borders remain original. The final image is the border set on two sides, and not the final two sides, thus resulting in a larger top and left border.

Additional image manipulations are possible. For example, image rotation may be readily accomplished through scripts such as:

```
fp_rotate_async(Evas_Object *src, int angle, uint32_t fill,
    enum fp_rotate_algorithm alg,
    void (*donecb)(void *data, Evas_Object *dst, Evas_Object *src),
    void *data);
```

The first parameter (src) is the source image, which may be a standard image object. This is the source image to be rotated. It will not be affected by the rotate itself. The angle determines the angle of rotation; it may be measured in a positive direction (counter-clockwise) from the X-axis in degrees. Negative angles and angles greater than 360 are treated consistently with methods known in the art. The function may be configured to seek out optimization options, so for example, with angles which are multiples of 90 degrees, the appearance of rotation may simply be achieved by copying rather than by calculation, thus improving the performance dramatically.

Figure 12:
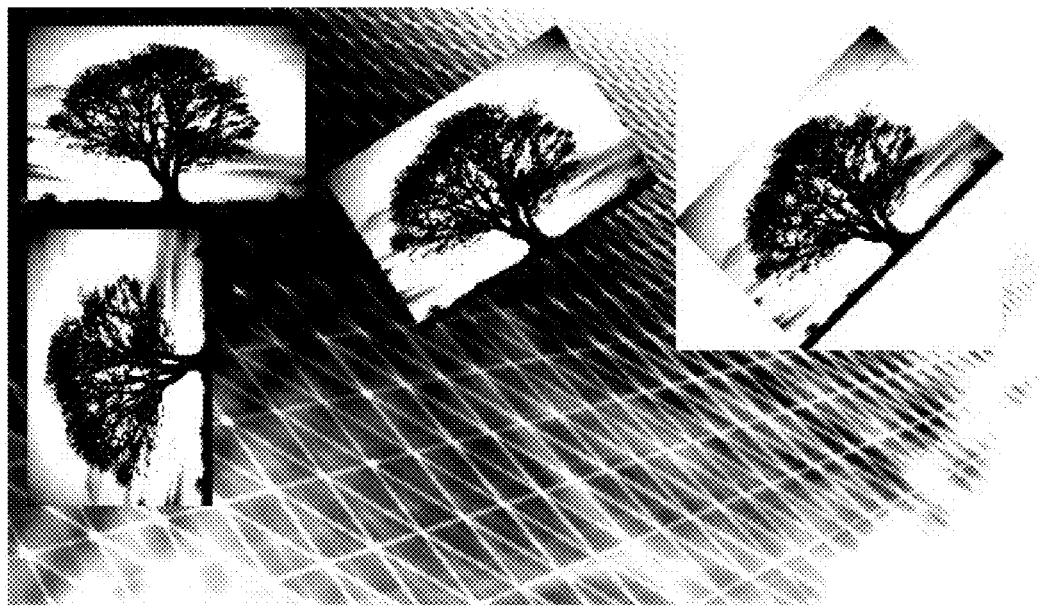

The created images may be rectangular, and rotated images are thus, in some embodiments, the same size or larger then the source image. Thus, some pixels in the destination may not be represented in the source image. The color and transparency of these "new" pixels may be set using the fill parameter. The fill parameter in the examples of FIG. 12 is a single 32 bit ARGB pixel value. For most cases a transparent background may be used, and this represented by a value of 0x 00. For even multiples of 90 degrees, this value preferably should not be used, as there is a 1-to-1 correspondence with images in the source and destination images. In FIG. 12, the original image is seen at the top left. The image is also displayed rotated 33 degrees, 45 degrees with fill, and at 90 degrees.

Similar to rotation, scaling of images is readily possible utilizing the following script:

```
struct fp_scale *fp_scale_async(Evas_Object *obj,
    enum fp_scale_algorithm scale,
    int ratio,
    void (*done_cb)(void *data, Evas_Object *scaled, Evas_Object *),
    void *data);
```

The example scaling script provides a way to create a new scaled image from a loaded image asynchronously, thus avoiding repeated resource-expensive scaling routines. One implementation provides two algorithms for scaling, a smooth scaling routine for high quality resolution, and a subsample method for maximum speed.

Figure 13:

The first parameter of the script is the object to be scaled. The next two parameters determine the parameters for the scaling itself. The first is the scaling routine, and the second is the ratio which determines the amount to scale the image down by. The final two parameters are the callback to be invoked on completion, and a user data pointer. Output of such a scaling routine may be seen in FIG. 13.

Figure 14:
Figure 15:

Lastly, FIGS. 14 and 15 illustrate outputs of layering scripts. In general, in some embodiments of the interface, each layer may be assigned an ID, a signed-integer. Layers may be positioned on top of each other—the highest (the top) is closest to the user, while the lowest (the bottom) is furthest from the user.

For example, an image on layer 10, will be drawn beneath text on layer 20. FIG. 14 illustrates this, with the tree image beneath the "Hello World" text. Changing the layer of the image to layer 30 (ten higher than the text) drastically changes the output, as seen in FIG. 15. It is important to note that this could be any layer greater than 20. The same image would have been produced on layer 21, 32, 499, or 2034214. Additionally lowering the text to layer 3, would have had the same effect (placing it beneath the image).

Additionally layers may be negative, so the image of FIG. 15 could have been produced with image on layer 12, the text on layer −29932 and the background at layer −300000. Object layers may be controlled using the call:

void evas_object_layer_set(Evas_Object *obj, int layer);

Because multiple layers can be confusing, in one implementation an object's layer ID may be queried using:

int evas_object_layer_get(Evas_Object *obj);

In addition to layers, objects may exist as stacks within the same layer. In general, as objects are added they are placed at the top of the layer. Manipulating stack order of objects may be done in a number of ways well known in the art. For example:

```
void evas_object_raise(Evas_Object *obj);
    void evas_object_lower(Evas_Object *obj);
```

Raising an object moves it to the top of the object stack for that layer, pushing all other objects on the same layer down. Lower moves it to the bottom, pushing the rest up in the stack. For more fine-grained control one may use:

```
void evas_object_stack_above(Evas_Object *obj,
Evas_Object *target);
    void evas_object_stack_below(Evas_Object *obj,
    Evas_Object *target);Ff
```

Continuing the example screenshots, FIGS. 16A to 16K and FIGS. 17A to 17G provide various screenshots of two mobile interface themes generated by some embodiment of the user interface control system. The first theme, as illustrated in FIGS. 16A to 16K, may be particularly desirous for young female users. The second displayed theme, as shown in FIGS. 17A to 17G, may be designed for a more general audience. The commonality between these example themes is that they may be displayed upon the same electronics device utilizing the same back end OS or Kernel. However, given the flexibility of the current invention, the interface look and feel may vary dramatically dependent upon user customizations.

Figure 16A:
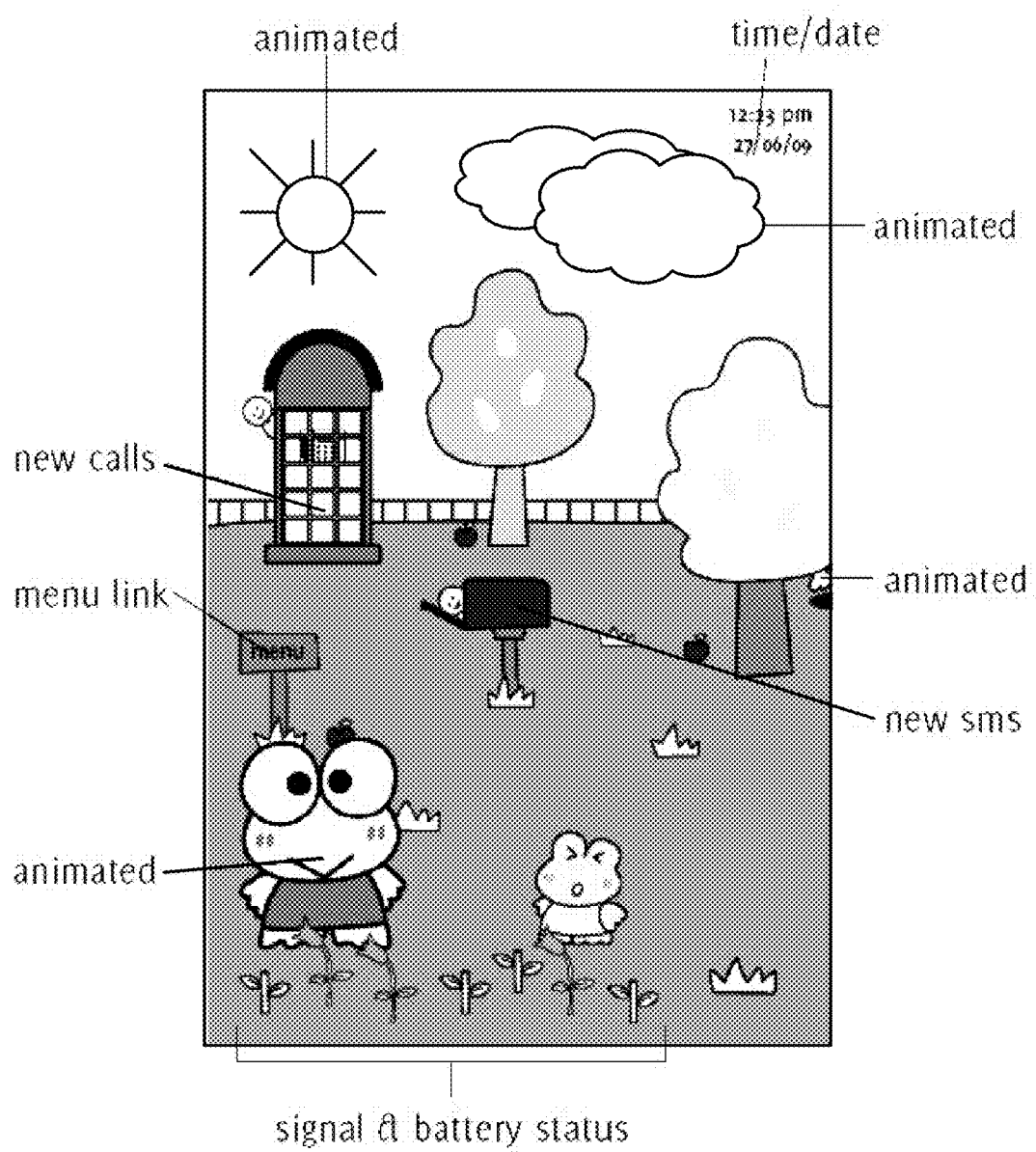
FIGS. 16A to 16K provide various screenshots of a first mobile interface theme generated by some embodiment of the user interface control system.

In FIG. 16A, the first theme is presented in a personalization of a user's home page for a cellular phone. For the sake of clarity, this first theme will be hereafter referred to as the "Demo theme". Multiple items in this example home page may be animated, including the sun, clouds characters and animals. Although not illustrated, the sky and backlighting of the display may likewise be animated. In some embodiments, the sky may change color, dependent upon time of the day or light sensors. Thus, at evening time the sky may be colored orange and the sun icon may be low on the horizon.

Continuing the example, as evening progresses the sun icon may set and be replaced by a moon icon. The sky color may darken and stars may be illustrated. In some embodiments, when the device is relocated to a different time zone, the interface may likewise register this shift in daylight hours and compensate the interface display accordingly. The time and date may be seen displayed in the top right hand corner of this example.

Additional icons may indicate location, new text messages, voicemails, cellular signal strength and battery status. In addition to visual modifications to the display, the present invention may likewise customize audio and tactile interface components. Thus, animations in a character on the screen may be accompanied with sounds and tactile outputs, such as a vibration.

Figure 16B:
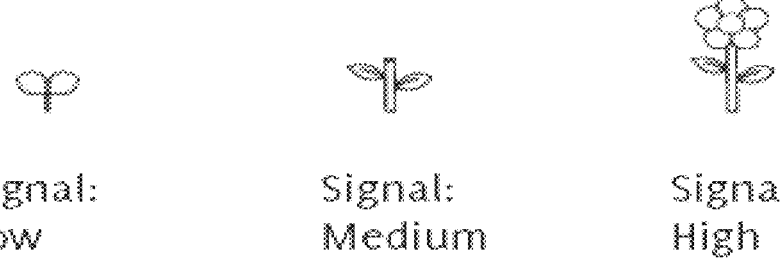

FIG. 16B illustrates visual outputs for the Demo theme which indicate relative signal strength. Strong cellular signals may correspond to full daisy like flowers. Low signals may correspond to a sprout. An intermediate signal may, in this example theme, be presented as a half grown flower.

Figure 16C:
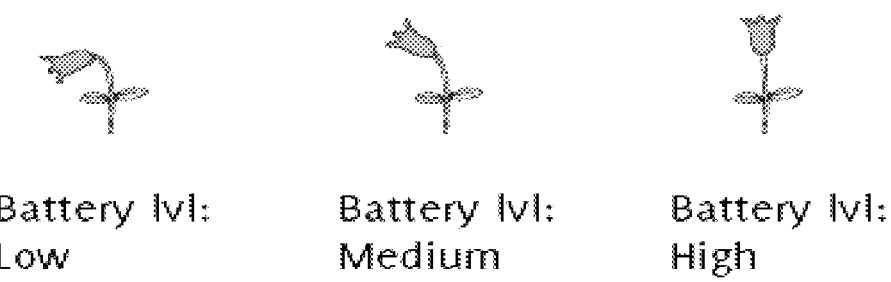

Likewise, FIG. 16C illustrates visual outputs for the Demo theme which indicate battery levels for the mobile device. Here the tulip flower wilts as power levels are diminished.

Figure 16D:
Figure 16E:
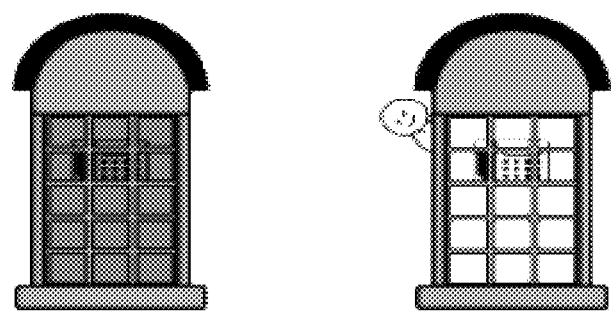

FIGS. 16D and 16E indicate if there are new text messages and new voicemail messages, respectively. Each of these visual components of 16B to 16E may be clearly visible in the home page of FIG. 16A.

Figure 16F:
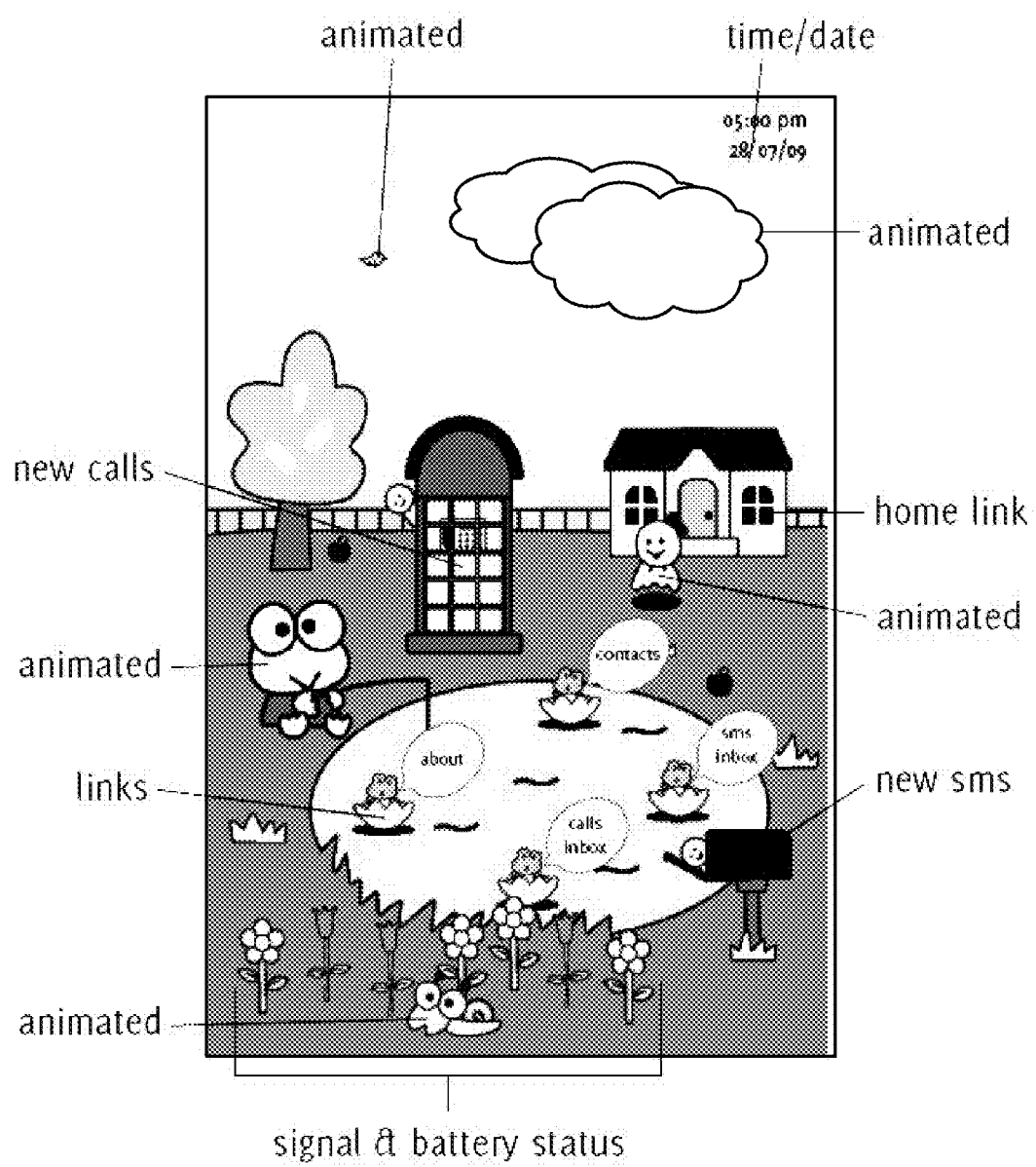
Figure 16G:
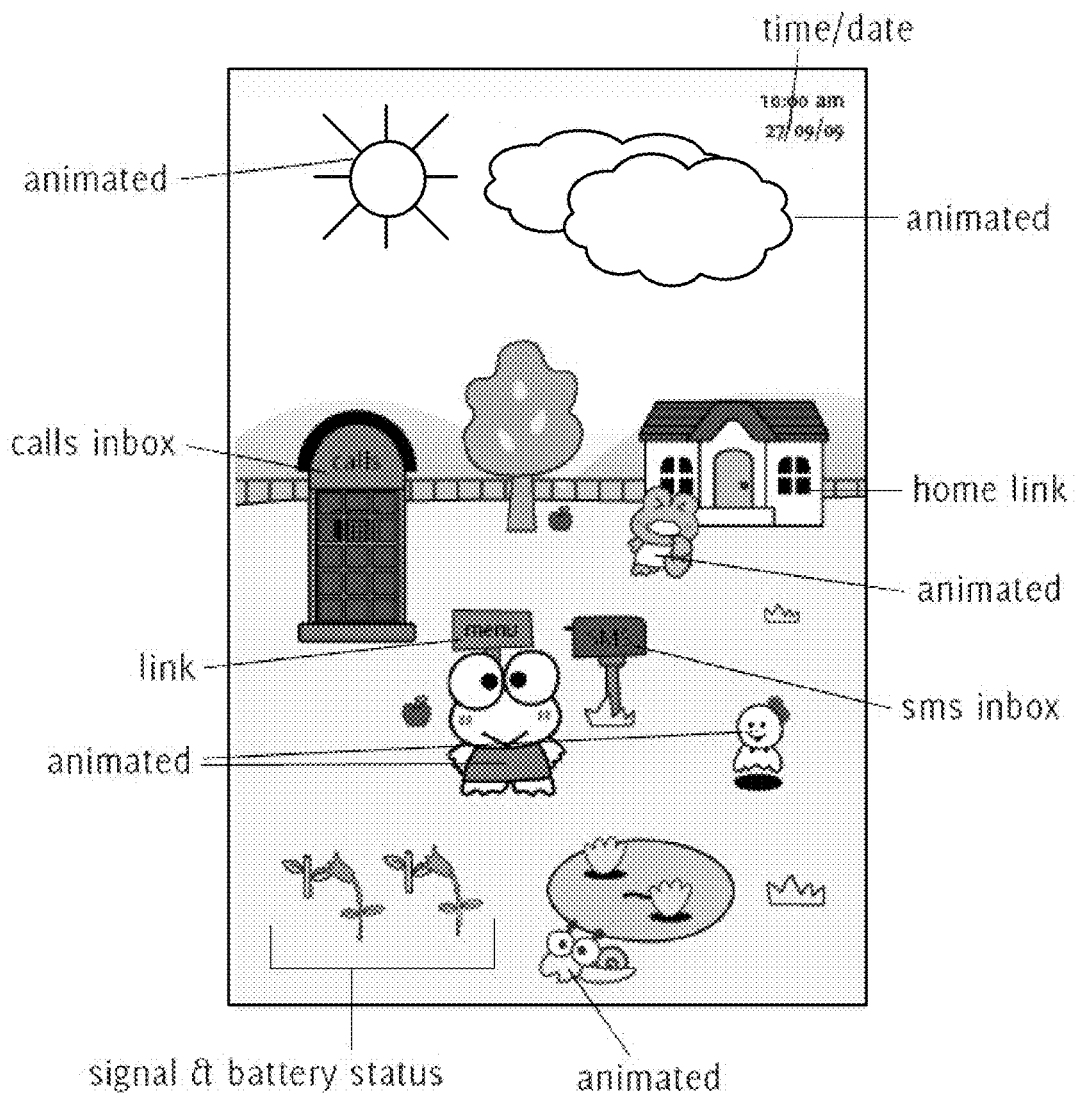

Continuing, FIG. 16F illustrates an example menu page for a device with the Demo theme. Again, particular objects, characters and animals may be animated. Links to other pages are provided as frogs in the pond. Battery, signal strength and message indicators are clearly seen. Selection of the "contacts" link may cause the display to change to the contact home screenshot illustrated in FIG. 16G. Again, portions of the screenshot may be animated, indicators of device status are provided, and navigation links are present.

Figure 16H:
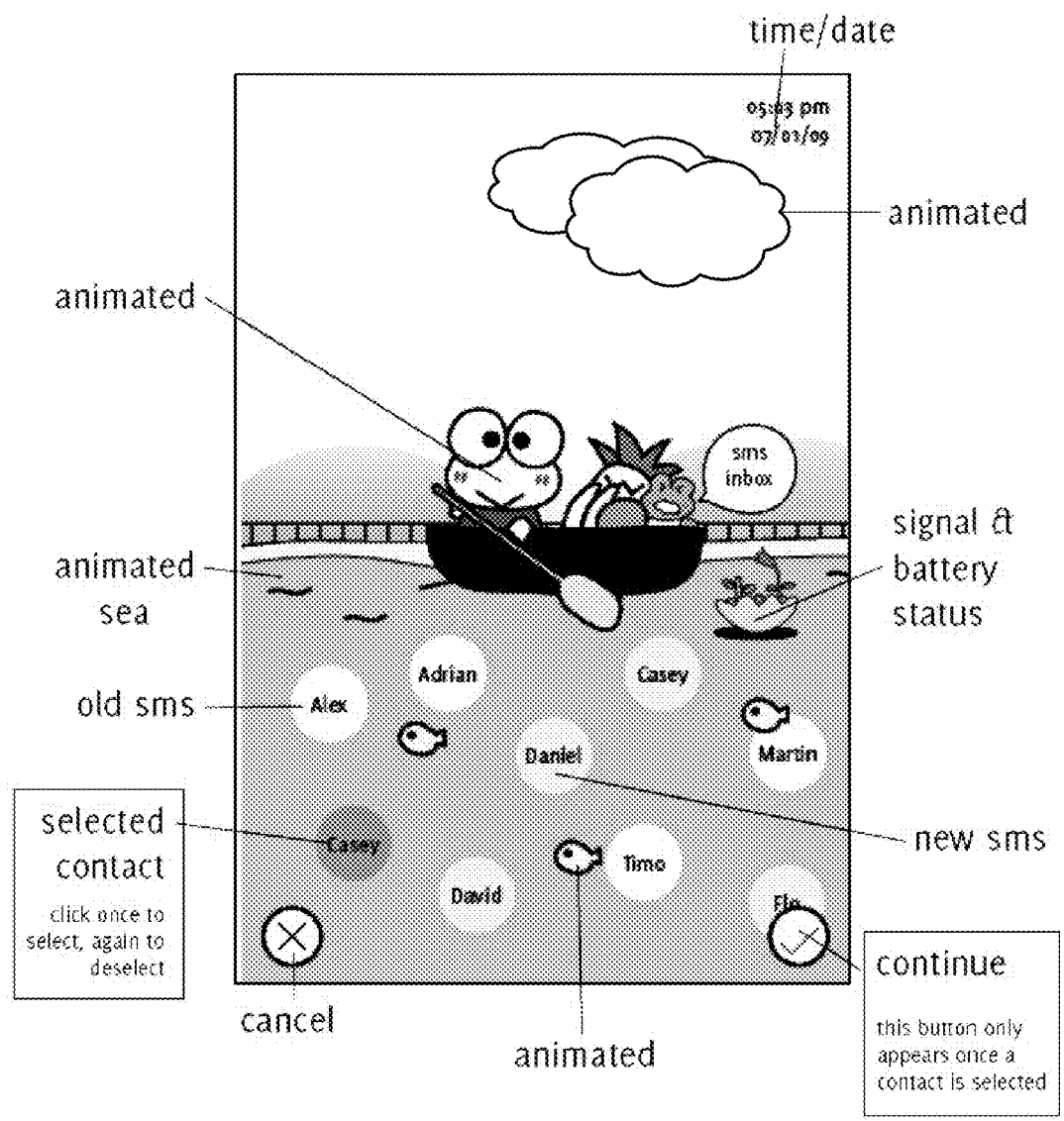

At FIG. 16H the user has selected the mailbox icon (linking the user to the SMS inbox). This display also includes animations. Contacts may be displayed in bubbles, in this example. Once a contact is selected a continue icon may become available to the user to compose a message to the selected contact. The user also has the option to cancel, thereby returning to the Contacts Home of FIG. 16G.

Figure 16I:
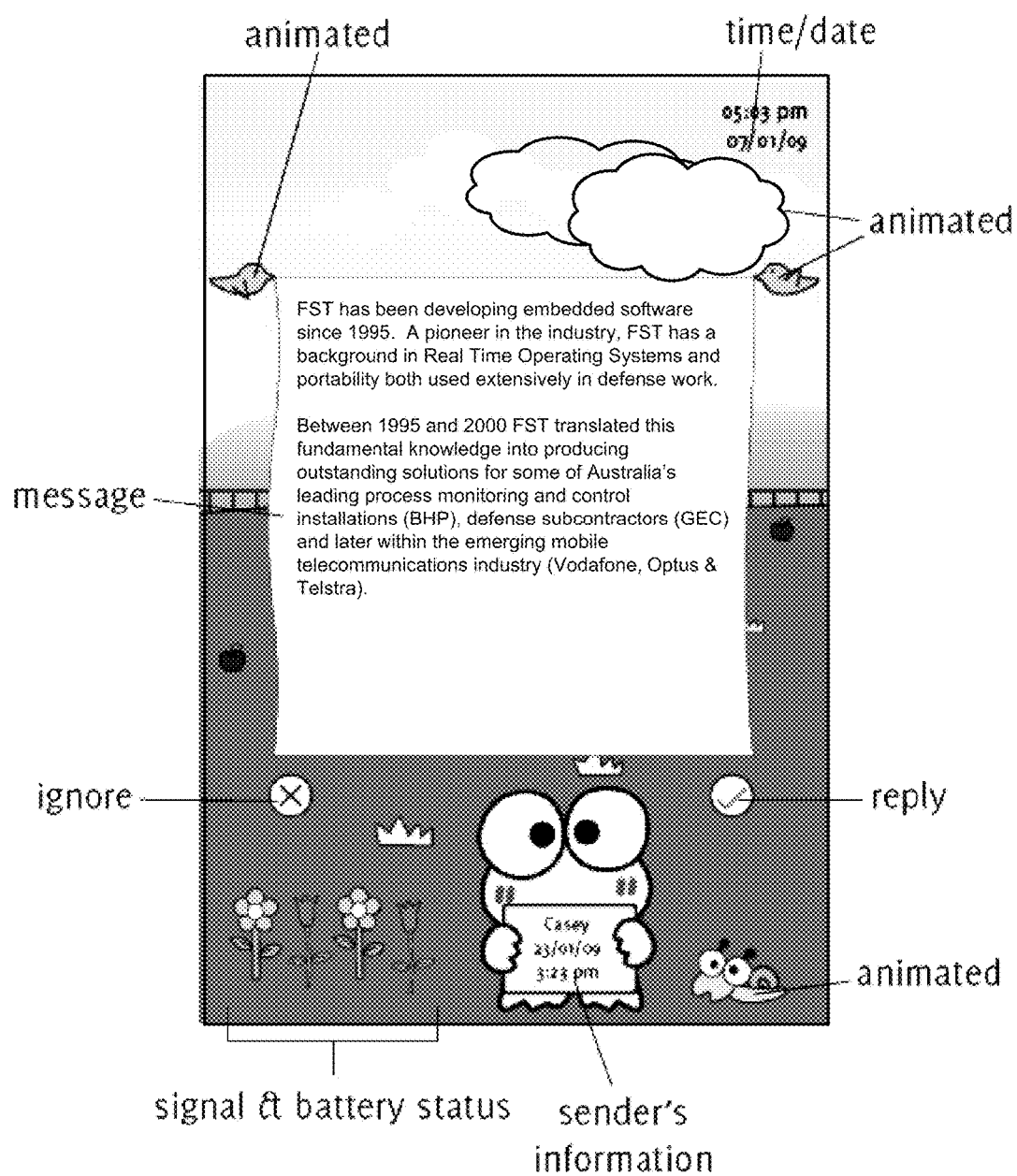
Figure 16J:
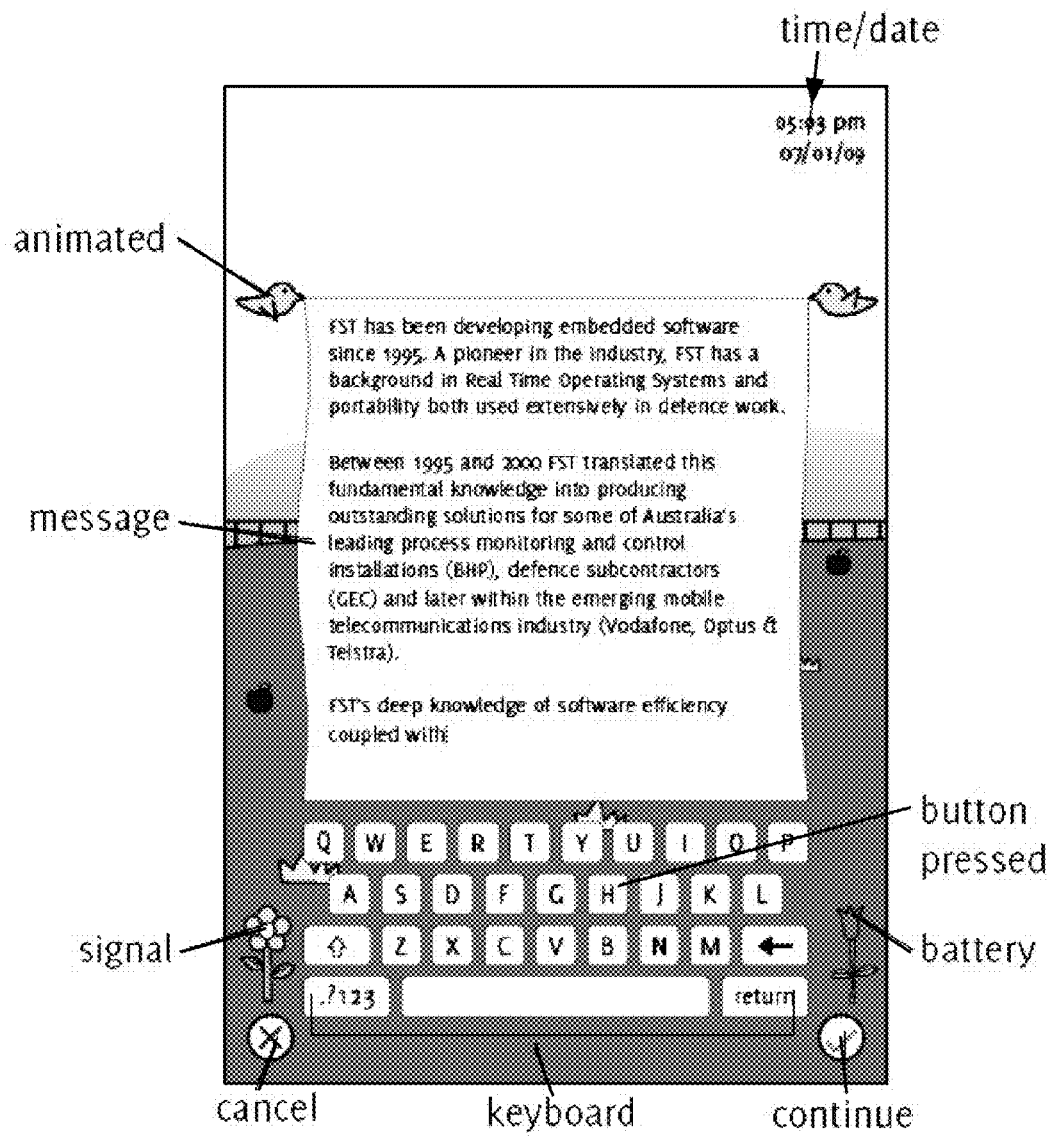
Figure 16K:
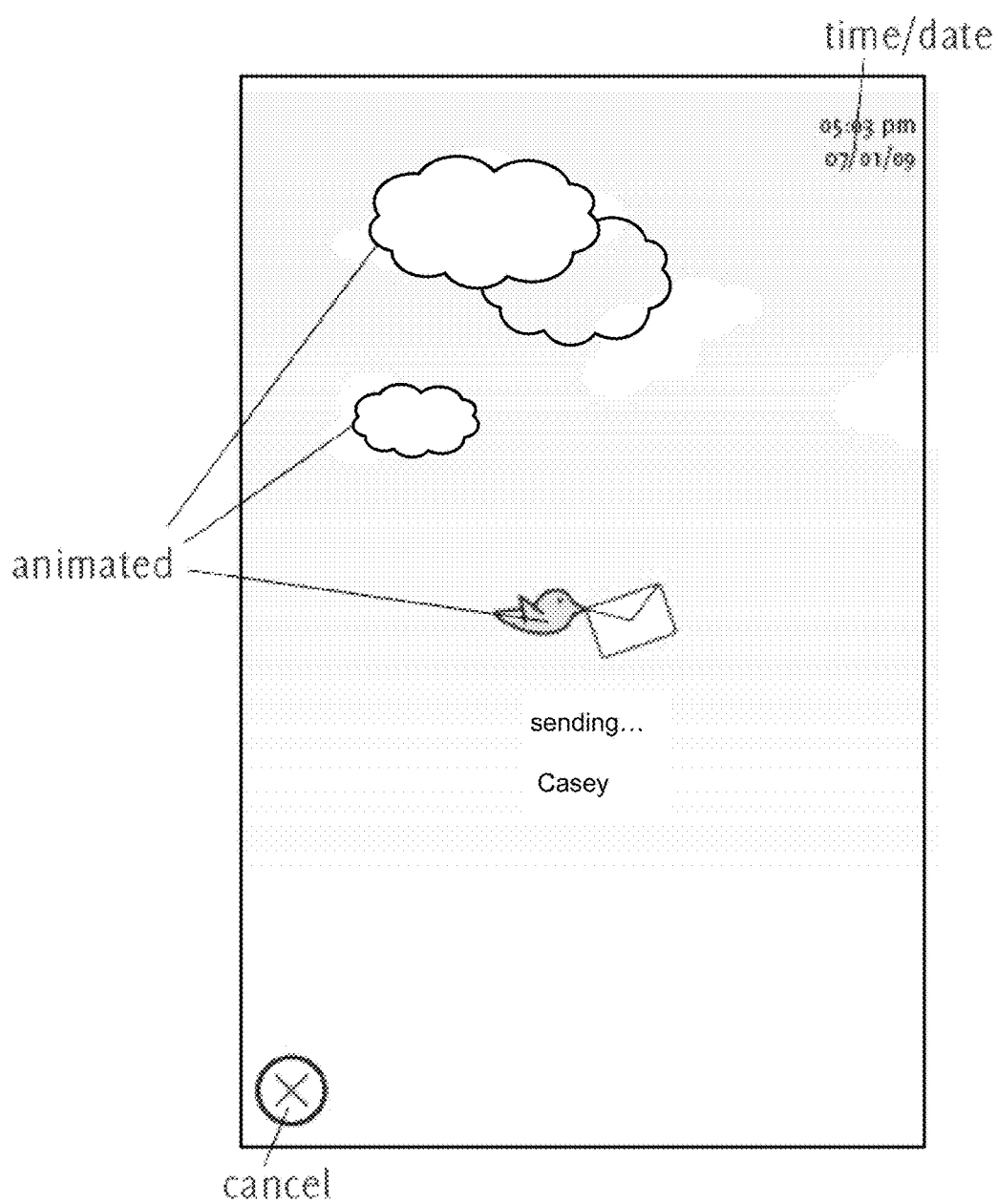

If the user opens a received message, the device may display the message in a themed display, as is seen at FIG. 16I. Again, common animations and device status indicators common to the Demo theme may be presented. The message and sender information may be presented as well. The user has the option of deleting (ignoring) the message or replying to it. If the user replies, a screen such as that illustrated in FIG. 16J may be provided. In this screenshot, the user is provided a keyboard, which in conjunction with a touch screen, may enable further user input. After a reply message is composed, an example sent image may be displayed for a given time increment, as is seen in FIG. 16K.

Like the Demo theme, FIGS. 17A to 17G provide various screenshots of a mobile interface theme generated by some embodiment of the user interface control system. This second theme will be referred to as a "neon theme" hereafter for the sake of clarity. The information displayed in the neon theme display may be substantially similar to that of the previous theme, however the overall appearance may vary drastically due to interception and manipulation, by the underlying system, of data being sent to the output drivers.

Figure 17A:
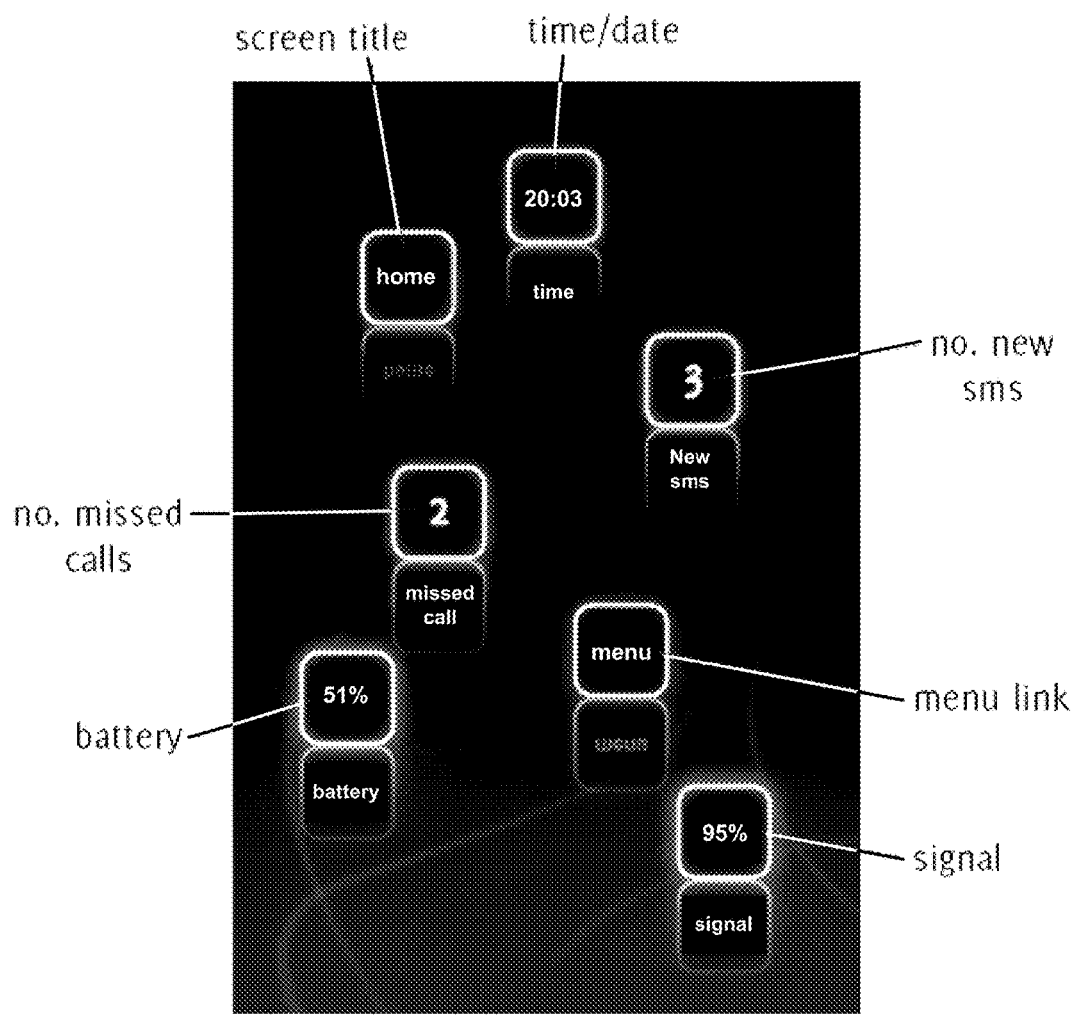
FIGS. 17A to 17G provide various screenshots of a second mobile interface theme generated by some embodiment of the user interface control system.

In FIG. 17A a home page for the device running neon theme scripts may be seen. Here the signal strength, battery levels and navigation links are illustrated in numerical form within neon boxes. The theme appearance hints that the neon elements are reflected upon a dark background. Particular "reflections" are true mirror images; however, some of these "reflections" include labels or relevant information. For example, signal strength is indicated as 95% in the neon box, and the "reflection" underneath indicates that this percentage is the signal value.

Although not illustrated in the present figures, the neon boxes may, in some embodiments, include color defined information. For example, all device status indicators such as time, date, signal strength and battery may be illustrated as green neon signs. Urgent messages, such as missed calls or new texts, may be red. Links may be blue colored, and the screen title may be grey colored. Additionally, some embodiments of this example may include a unique set of tactile and audio interface controls as well.

Figure 17B:
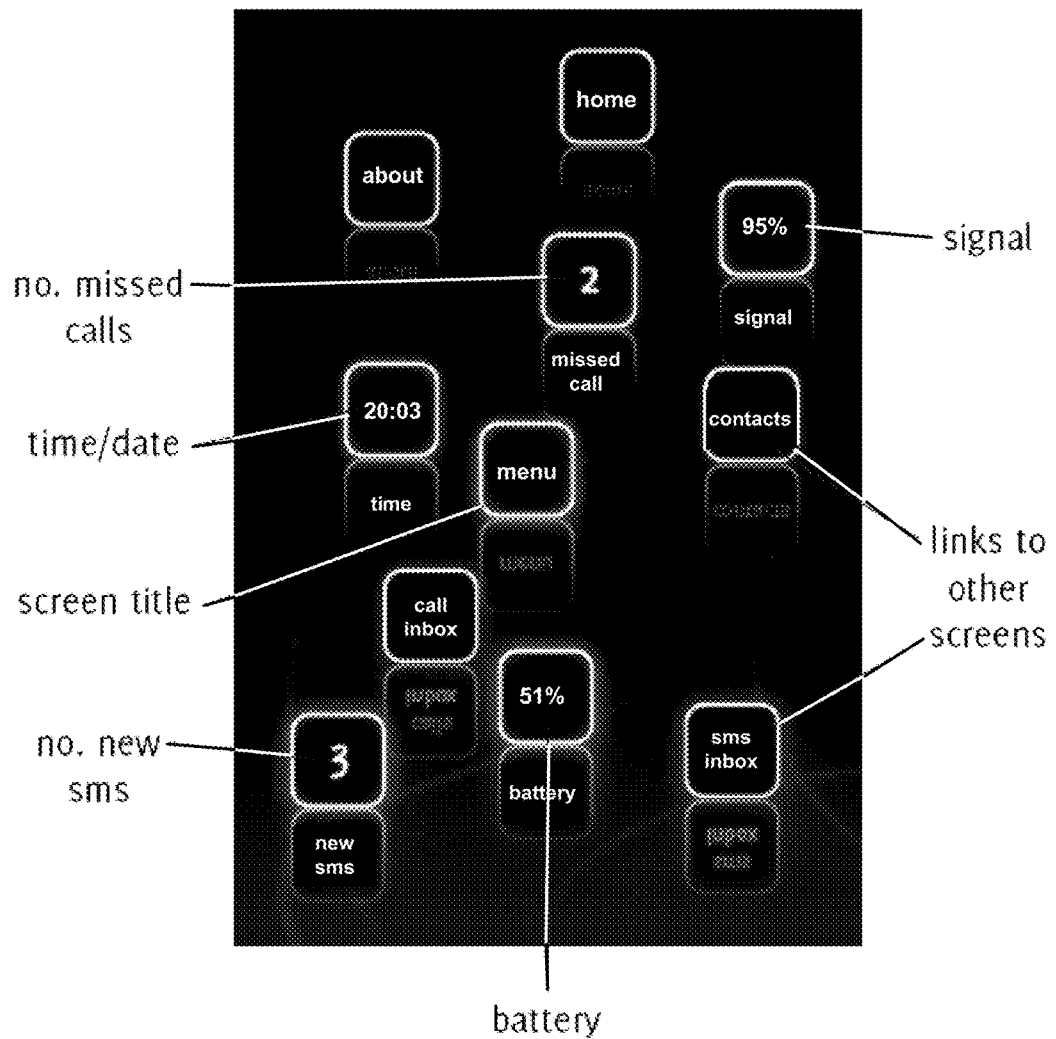

FIG. 17B may illustrate one example of a menu page for the neon themed display. Again, much of the most user relevant material remains on screen. Color coding may be of particular use in this screen given the large array of neon boxes.

Figure 17C:
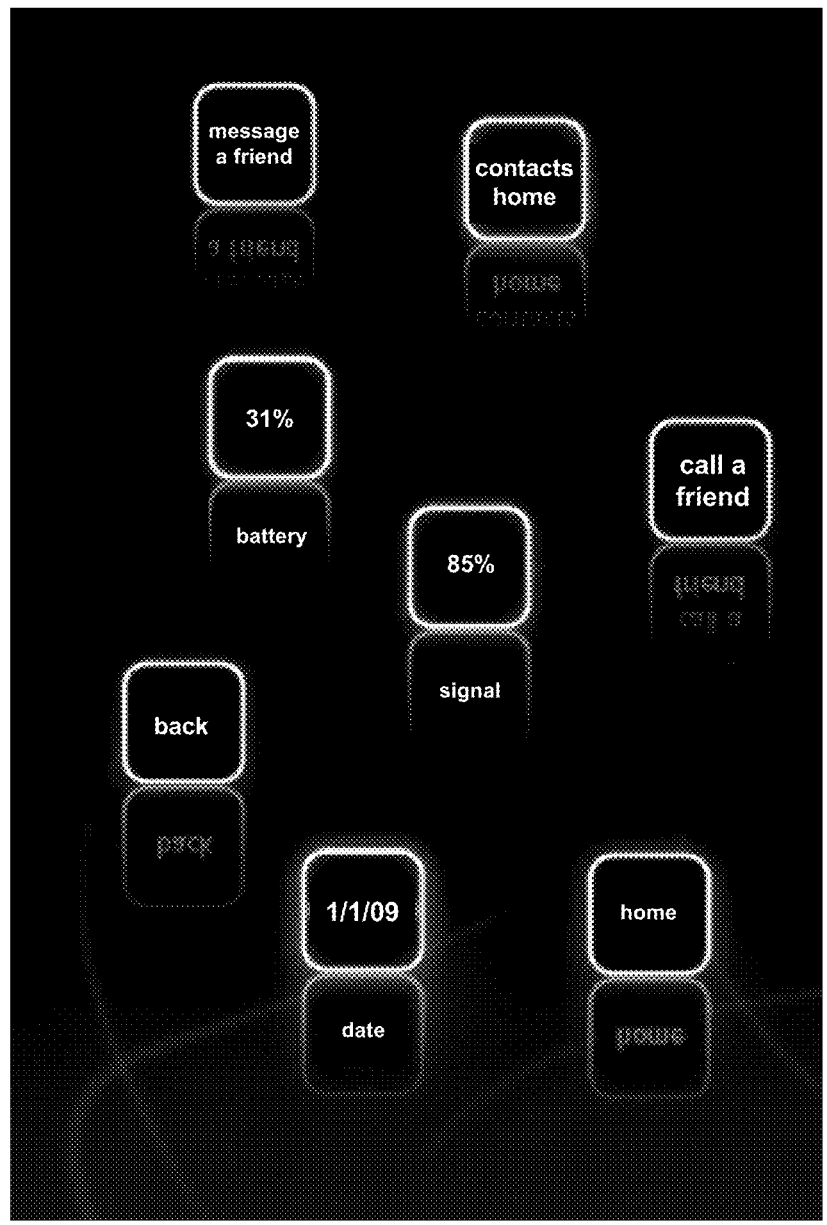
Figure 17D:
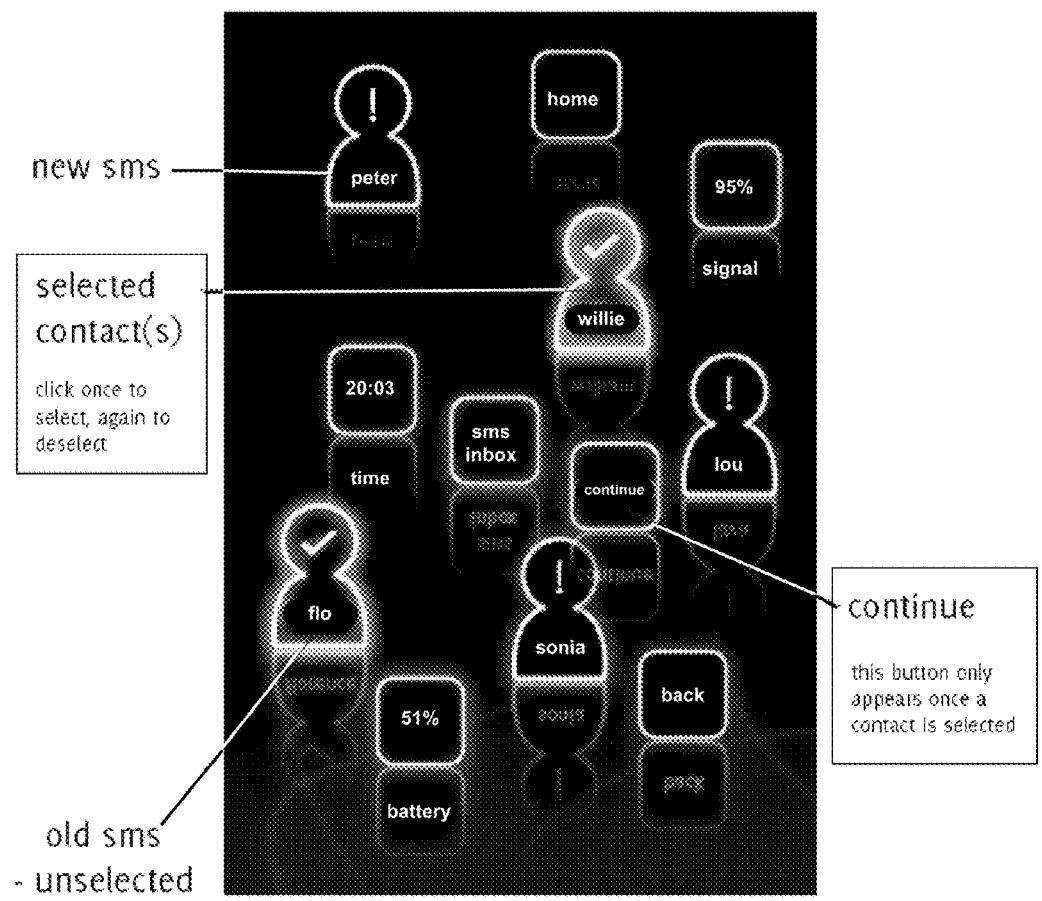
Figure 17E:
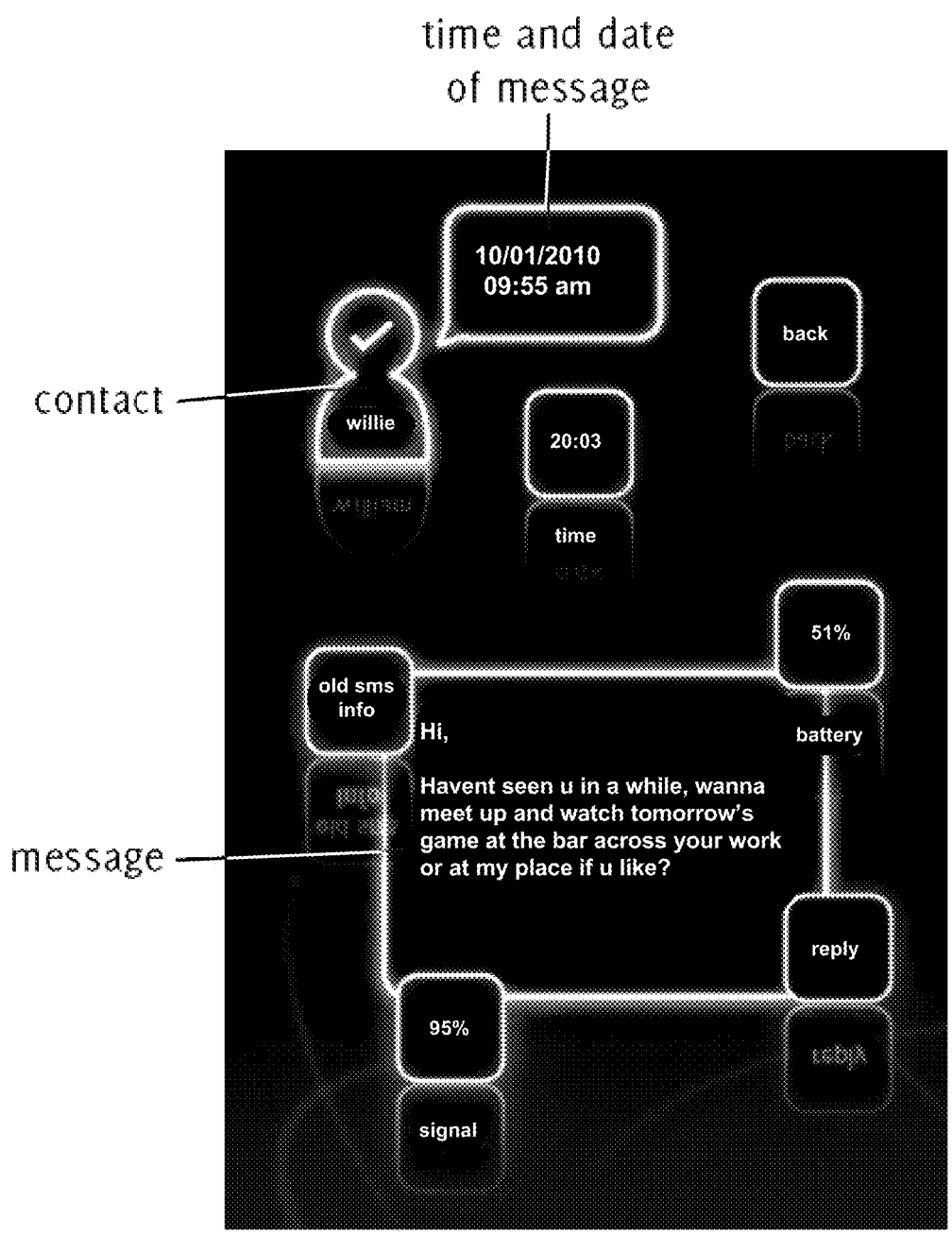
Figure 17F:
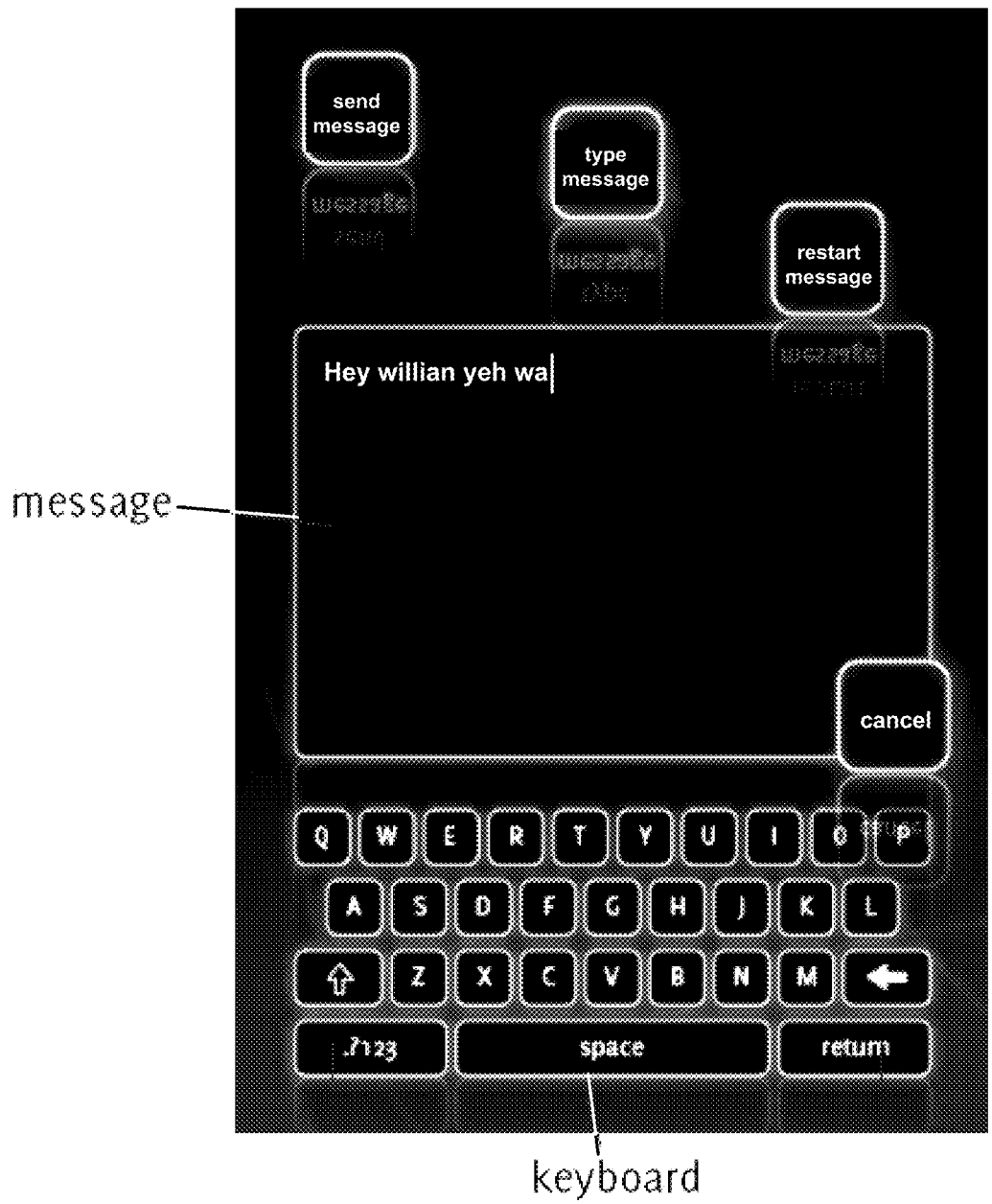
Figure 17G:
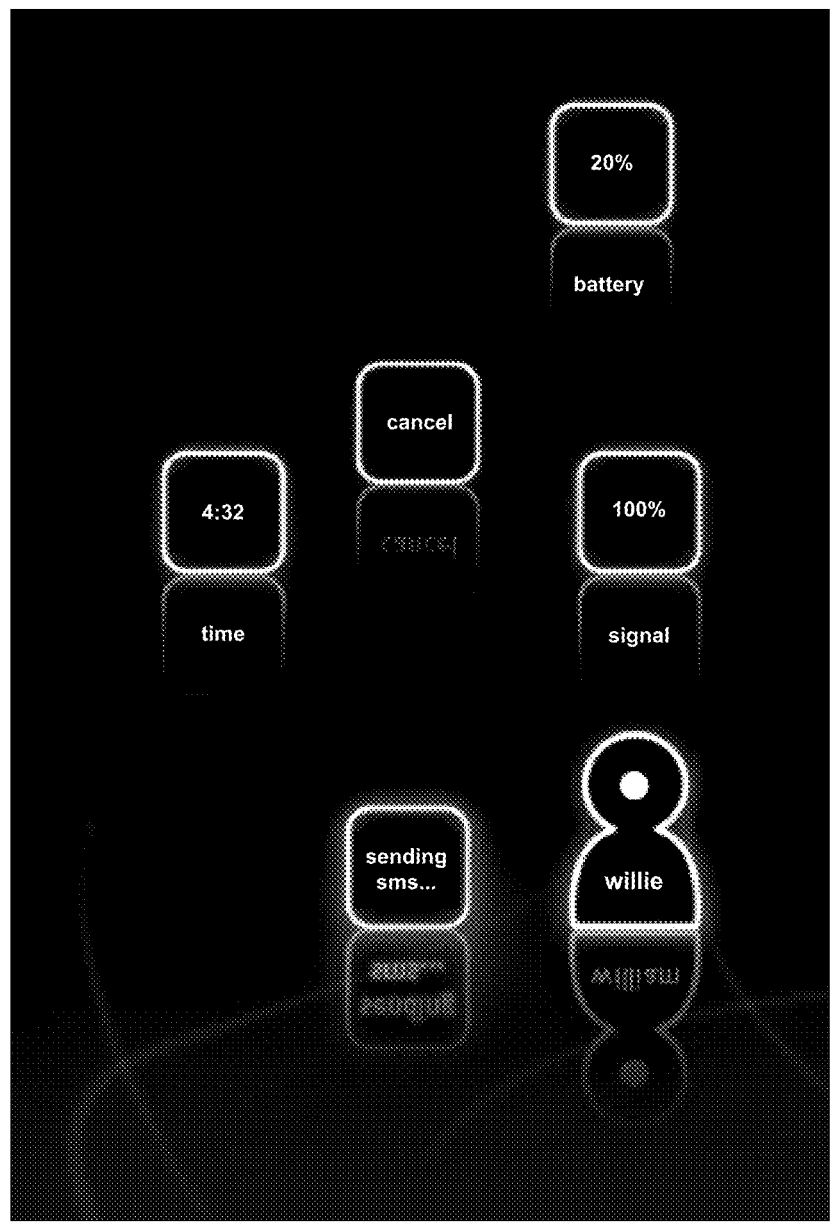

FIG. 17C may then illustrate one example of a contacts home page for the neon theme, and likewise, FIG. 17D may be a text message inbox. Here individual contacts are illustrated as people shaped icons. Symbols, such as check marks and exclamation marks may indicate contacts which have been responded to or those with new messages. Contacts may be selected by the user. FIG. 17E then illustrates an example of a message display in the neon theme. Further, if the user should choose to do so, FIG. 17F illustrates an example of a text message response page. Again, a touch screen keyboard may be utilized in this example. Lastly, FIG. 17G illustrates an example "sent" screen for the neon theme.

The purpose of presenting FIGS. 16A to 16K as well as 17A to 17G is to further indicate the power and scope of user interface customization possible utilizing the present invention. In both of these themed cases, the same device running the same background applications and operating system may be utilized. Driver data may be intercepted and modified according to scripts, in some embodiments. The degree of modification, and whether to modify the data at all, may be dictated by the applications themselves, or the device status.

In addition to the relatively few examples provided, the present invention may be configured to include a wide range of other graphical, acoustic and tactile manipulations. This may include text display, resizing, font changes and color changes; further image effects including transparency, overlays, layouts, movements and clips; sound responses to various alerts and notifications; tactile outputs; media outputs and combinations of outputs. Further, composite outputs are possible, whereby composites are theme-able abstract animated objects. Thus, the sheer range of available outputs makes it impractical to provide an inclusive listing of examples in this application. Furthermore, the benefits gained from adding additional examples are unnecessary at this point for the understanding of the present invention.

In sum, systems and methods for user interface control and personalization on an electronic device is provided. Such a system provides control over user interfaces which are normally predefined and constrained by a manufacturer. Some embodiments of the system enables near run time modification of user interface content in an efficient manner by utilizing an interpretive element embodied in a virtual machine.

While the system and methods have been described in functional terms, embodiments of the present invention may include entirely hardware, entirely software or some combination of the two. Additionally, manual performance of any portion of the methods disclosed is considered by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A method for reskinning a user interface of a consumer electronics device, the method comprising:
   intercepting data between an application and input and output drivers within the consumer electronics device, wherein the input and output drivers control at least one of video, audio and tactile interfaces, and wherein the at least one interface includes a plurality of input key variables;
   accessing a database for at least one key variable of the plurality of input key variables to determine a key type for the at least one key variable, wherein the key type is either a table or a function;
   transforming the intercepted data by use of a set of configuration files, wherein the set of configuration files are alterable by a user and in response to a plurality of external source cues, wherein the plurality of external source cues include a limited power indicator, time, location and ringer alert style, and wherein the transforming includes applying a function to the intercepted data when the key type is a function, and when the key type is a table retrieving additional data from a second database that associates value tuples to the key and incorporating said additional data with the intercepted data; and
   executing scripted user interface components using the set of configuration files and the external source cues to generate a uniquely customized interface, wherein the transformed intercepted data replaces objects presented in the interfaces with replaced objects responsive to the set of configuration files, wherein a subset of the replaced objects are consolidated into a single output that includes animations or stepwise alterations responsive to timers and I/O watching files causing at least one of the animations and alterations to move as time progresses, battery levels change and signal strength varies, and wherein the background is at least one of animated and altered to include moving objects based upon timers, and differing images displayed according to if unread messages or missed calls are present.

2. The method as recited in claim 1, further comprising: determining if a transparency cue is present, wherein the transparency cue specifies that the data should remain unmodified, and if the transparency cue is present, then forwarding the data to its original destination.

3. The method as recited in claim 1, further comprising: determining if a limited power indicator is present, wherein the limited power indicator is conditioned upon power level of the consumer electronics device, and if the limited power indicator is present, then:
   modifying the data according to a limited theme, wherein the limited theme includes a plurality of programmable limited scripts, wherein the plurality of programmable limited scripts includes scripts for a high contrast color scheme and reduced screen illumination, and outputting the modified data to the original destination; and
else, if the limited power indicator is absent, modifying the data according to a preferred theme, wherein the preferred theme includes a plurality of programmable preferred scripts, and outputting the modified data to the original destination; and
   wherein the preferred theme and the limited theme are stored within the database.

4. The method as recited in claim 3, wherein the configurable database is read by an interpreter.

5. The method as recited in claim 3, wherein the configurable database is compiled to bytecode.

6. The method as recited in claim 3, wherein the configurable database incorporates both current and prior versions of the limited and preferred scripts, and wherein an error in the current version of one of the scripts causes reversion to the prior version of that script.

7. The method as recited in claim 3, wherein the preferred and limited scripts include information that describes the format, layout or content of the modified data.

8. The method as recited in claim 7, wherein the preferred and limited scripts reference at least one of scaling, skewing, transformation, animation and alteration information.

9. The method as recited in claim 1, further comprising intercepting data between an operating system and the input and output drivers of the consumer electronics device.

10. The method as recited in claim 1, wherein the objects moving in the background are cloud images, animals and a sun, and wherein sky in the background coloration is altered according to time of day, and further wherein animated stars are displayed during night hours.

11. The method as recited in claim 1, further comprising monitoring ambient noise on a microphone of the consumer electronics device and modifying ringer volume and cadence responsive to the level of ambient noise and time of day.

12. The method as recited in claim 1, further comprising receiving a tactile input from a user via at least one accelerometer of the tactile interface, with an acceleration signature matching a finger tapping the consumer electronics device, to acknowledge an event occurring on the consumer electronics device.

13. The method as recited in claim 1, wherein the executed scripted user interface components include receiving input of a number dialed by the user, displaying the number in a first size, decreasing the number from the first size to a second size responsive to a timer, and moving the second sized number in a number string for dialing.

14. The method as recited in claim 1, wherein the transformed intercepted data includes non-uniform scaling of images, wherein the images are divided into nine discrete sections, and each section is scaled in size independently.

15. An apparatus for reskinning a user interface of a consumer electronics device, the apparatus comprising:
  a microprocessor or series of microprocessors executing instructions which include:
  intercepting data between an application and input and output drivers within the consumer electronics device, wherein the input and output drivers control at least one of video, audio and tactile interfaces, and wherein the at least one interface includes a plurality of input keys;
  accessing a database for at least one key of the plurality of input keys to determine a key type for the at least one key, wherein the key type is either a table or a function, and wherein the key type is determined by a single bit flag;
  transforming the intercepted data by use of a set of configuration files, wherein the set of configuration files are alterable by a user and in response to a plurality of external source cues, wherein the plurality of external source cues include a limited power indicator, time, location and ringer alert style, and wherein the transforming includes applying a function to the intercepted data when the key type is a function, and when the key type is a table retrieving additional data from a second database that associates value tuples to the key and incorporating said additional data with the intercepted data; and
  executing scripted user interface components using the set of configuration files and the external source cues to generate a uniquely customized interface, wherein the transformed intercepted data replaces objects presented in the interfaces with replaced objects responsive to the set of configuration files, wherein a subset of the replaced objects are consolidated into a single output that includes animations or stepwise alterations responsive to timers and I/O watching files causing at least one of the animations and alterations to move as time progresses, battery levels change and signal strength varies, and wherein the background is at least one of animated and altered to include moving objects based upon timers, and differing images displayed according to if unread messages or missed calls are present.

16. The apparatus of claim 15, wherein the instructions also include determining if a transparency cue is present, wherein the transparency cue specifies that the data should remain unmodified, and if the transparency cue is present, then forwarding the data to its original destination.

17. The apparatus of claim 15, wherein the instructions further include:
  determining if a limited power indicator is present, wherein the limited power indicator is conditioned upon power level of the consumer electronics device, and if the limited power indicator is present, then:
    modifying the data according to a limited theme, wherein the limited theme includes a plurality of programmable limited scripts, wherein the plurality of programmable limited scripts includes scripts for a high contrast color scheme and reduced screen illumination, and outputting the modified data to the original destination; and
  else, if the limited power indicator is absent, modifying the data according to a preferred theme, wherein the preferred theme includes a plurality of programmable preferred scripts, and outputting the modified data to the original destination; and
  wherein the preferred theme and the limited theme are stored within the database.

18. The apparatus of claim 17, wherein the configurable database is read by an interpreter.

19. The apparatus of claim 17, wherein the configurable database is compiled to bytecode.

20. The apparatus of claim 17, wherein the configurable database incorporates both current and prior versions of the limited and preferred scripts, and wherein an error in the current version of one of the scripts causes reversion to the prior version of that script.

21. The apparatus of claim 17, wherein the preferred and limited scripts include information that describes the format, layout or content of the modified data.

22. The apparatus of claim 21, wherein the preferred and limited scripts reference at least one of scaling, skewing, transformation, animation and alteration information.

23. The apparatus of claim 15, wherein the instructions also include intercepting data between an operating system and the input and output drivers of the consumer electronics device.

* * * * *